US012782908B2

(12) United States Patent
Kobel et al.

(10) Patent No.: US 12,782,908 B2
(45) Date of Patent: Nov. 3, 2026

(54) EQUIPMENT UTILIZATION MONITORING SYSTEM AND METHOD

(71) Applicant: Oshkosh Corporation, Oshkosh, WI (US)

(72) Inventors: Korry D. Kobel, Oshkosh, WI (US); Fredric L. Yutzy, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 577 days.

(21) Appl. No.: 17/885,257

(22) Filed: Aug. 10, 2022

(65) Prior Publication Data

US 2023/0046835 A1 Feb. 16, 2023

Related U.S. Application Data

(60) Provisional application No. 63/231,999, filed on Aug. 11, 2021.

(51) Int. Cl.
*G05B 19/406* (2006.01)

(52) U.S. Cl.
CPC .................................. *G05B 19/406* (2013.01)

(58) Field of Classification Search
CPC ...... G05B 19/406; B66F 9/07581; B66F 9/20; B66F 9/24; B66F 11/042; B66F 11/046; E02F 9/205; E02F 9/261; E02F 9/264; G06Q 10/20
See application file for complete search history.

(56) References Cited

U.S. PATENT DOCUMENTS

| | | | | |
|---|---|---|---|---|
| 4,456,093 A * | 6/1984 | Finley | B66F 11/046 182/2.11 |
| 6,405,114 B1 * | 6/2002 | Priestley | B66F 11/046 701/50 |
| 6,449,884 B1 | 9/2002 | Watanabe et al. | |

(Continued)

FOREIGN PATENT DOCUMENTS

| | | |
|---|---|---|
| WO | WO-2022/125780 A1 | 6/2022 |
| WO | WO-2022/140277 A1 | 6/2022 |

(Continued)

OTHER PUBLICATIONS

International Preliminary Report on Patentability issued in connection with PCT/US2022/039967 dated Feb. 13, 2024.

*Primary Examiner* — Mohammad Ali
*Assistant Examiner* — Dhruvkumar Patel
(74) *Attorney, Agent, or Firm* — Foley & Lardner LLP

(57) ABSTRACT

A work machine includes a chassis, a wheel, an implement, a user interface, and a utilization monitoring system. The wheel is rotatably coupled to the chassis. The implement is movable relative to the chassis. The user interface is configured to receive a user input. The utilization monitoring system includes one or more memory devices configured to store instructions thereon that, when executed by one or more processors, cause the one or more processors to obtain one or more values representing an operational range of the implement; receive the user input; determine a value representing a position of the implement; and determine a value representing a utilization of the implement by comparing the position of the implement to the one or more values representing the operational range of the implement.

20 Claims, 16 Drawing Sheets

(56) References Cited

U.S. PATENT DOCUMENTS

| | | | | |
|---|---|---|---|---|
| 9,460,051 | B2 | 10/2016 | Horne | |
| 12,029,163 | B2 * | 7/2024 | Rotole | A01B 63/002 |
| 2007/0124000 | A1 * | 5/2007 | Moughler | G05B 19/0426 701/50 |
| 2009/0099897 | A1 | 4/2009 | Ehrman et al. | |
| 2012/0239259 | A1 * | 9/2012 | McCabe | B62B 3/0612 701/50 |
| 2013/0096799 | A1 * | 4/2013 | Horne | E02F 9/2054 701/99 |
| 2014/0058616 | A1 | 2/2014 | De Oliveira et al. | |
| 2015/0259185 | A1 * | 9/2015 | Ditty | B66F 11/046 182/19 |
| 2018/0143734 | A1 | 5/2018 | Ochenas et al. | |
| 2018/0171578 | A1 * | 6/2018 | Smekal | E02F 3/433 |
| 2020/0207600 | A1 * | 7/2020 | Bonnefoy | B66F 17/006 |
| 2020/0317489 | A1 | 10/2020 | Bhatia et al. | |
| 2020/0317492 | A1 | 10/2020 | Bhatia et al. | |
| 2021/0238021 | A1 * | 8/2021 | Masters | B66C 13/44 |
| 2022/0194765 | A1 * | 6/2022 | Eckhardt | B66F 13/00 |
| 2022/0252086 | A1 * | 8/2022 | Eckhardt | B66F 17/006 |
| 2022/0397890 | A1 * | 12/2022 | Hirakawa | G06Q 50/02 |

FOREIGN PATENT DOCUMENTS

| | | | |
|---|---|---|---|
| WO | WO-2022/155520 | A1 | 7/2022 |
| WO | WO-2022/155527 | A1 | 7/2022 |
| WO | WO-2022/155540 | A1 | 7/2022 |
| WO | WO-2022/155542 | A1 | 7/2022 |

* cited by examiner

EQUIPMENT UTILIZATION MONITORING SYSTEM AND METHOD

CROSS-REFERENCE TO RELATED APPLICATIONS

This U.S. application claims the benefit of and priority to U.S. Provisional Application No. 63/231,999, filed Aug. 11, 2021, the disclosure of which is incorporated herein by reference in its entirety.

BACKGROUND

Work equipment such as lifts and telehandlers sometimes require tracking, tasking, monitoring, and servicing at a work site. Managers and operators of working machines typically rely on discrete systems, applications, and methods to perform these functions for each piece of equipment. Often, a physical inspection of a machine is necessary to determine its state, status, and/or condition. Additionally, on work sites encompassing a large area or involving many pieces of equipment, it is often time-consuming for equipment operators or service technicians to determine the statuses, capacities, and current or previous utilization of the equipment for a large number of machines.

In some instances, work equipment is rented from an owner of the equipment. It is often difficult for the owner of the equipment, the manager, and the operator to determine the historical level of use and overall utilization of the work equipment, which may negatively impact the parties' ability to enforce contractual agreements, determine accurate maintenance schedules, dispatch work equipment, and otherwise manage and monitor the work equipment.

SUMMARY

One exemplary embodiment relates to a work machine including a chassis, a wheel, an implement, a user interface, and a utilization monitoring system. The wheel is rotatably coupled to the chassis. The implement is movable relative to the chassis. The user interface is configured to receive a user input. The utilization monitoring system includes one or more memory devices configured to store instructions thereon that, when executed by one or more processors, cause the one or more processors to obtain one or more values representing an operational range of the implement; receive the user input; determine a value representing a position of the implement; and determine a value representing a utilization of the implement by comparing the position of the implement to the one or more values representing the operational range of the implement.

In some embodiments, the instructions further cause the one or more processors to determine a value representing a motion of the implement by comparing the value representing the position of the implement to a value representing a position of the implement corresponding to an earlier point of time. In some embodiments, determining the value representing the utilization of the implement includes comparing the value representing the motion of the implement to the one or more values representing the operational range of the implement.

In some embodiments, the user interface comprises an input device operable in a first state and a second state, wherein when the input device is in the first state the implement is powered, and wherein when the input device is in the second state the implement is unpowered.

In some embodiments, the instructions cause the one or more processors to determine a value representing a quantity of time during which the input device is in the first state.

In some embodiments, determining a value representing the utilization of the implement includes comparing the value representing the quantity of time during which the input device is in the first state to a value representing a different quantity of time.

In some embodiments, the work machine includes a load sensor configured to detect a load applied to the implement; wherein determining a value representing the utilization of the implement comprises comparing the load to the one or more values representing the operational range of the implement.

In some embodiments, the one or more values representing the operational range of the implement is a function of the load detected by the load sensor.

In some embodiments, determining the value representing the utilization of the implement includes determining whether the position of the implement corresponds to a value of a limit of the operational range.

In some embodiments, determining the value representing the utilization of the implement includes determining whether the user input corresponds to the position of the implement exceeding the value of the limit of the operational range.

In some embodiments, the one or more values representing the operational range of the implement includes a value representing a height limit of the implement relative to the chassis.

In some embodiments, the value representing the position of the implement is at least partially based on a value representing a height of the implement relative to the chassis.

In some embodiments, the implement includes a platform.

In some embodiments, the user interface is a first user interface, and the work machine includes a second user interface. In some embodiments, the first user interface is coupled to the implement.

Another exemplary embodiment relates to a utilization monitoring system for work machines, the utilization monitoring system includes one or more processors, and one or more memory devices. The one or more memory devices are configured to store instructions thereon that, when executed by the one or more processors, cause the one or more processors to obtain one or more values representing an operational range of an implement of a work machine, obtain a value representing at least one of a position of the implement or a load on the implement, and determine a value representing a utilization of the implement based on a comparison between the value representing the position of the implement or the load on the implement and the one or more values representing the operational range of the implement.

In some embodiments, the utilization monitoring system includes a user interface comprising a display and a user input device, the user input device configured to receive a user input. In some embodiments, the instructions further cause the one or more processors to present, via a graphical user interface on the display, the value representing the utilization of the implement.

In some embodiments, the instructions cause the one or more processors to determine a value representing a comparison between the value representing the at least one of the position of the implement or the load on the implement and a threshold value.

In some embodiments, the instructions cause the one or more processors to determine a value representing a quantity of time during which the value representing the comparison between the value representing the at least one of the position of the implement or the load on the implement and a threshold value is different than a second threshold value.

Another exemplary embodiment relates to a method including obtaining, via a utilization monitoring system, one or more values representing an operational range of an implement of a work machine; obtaining, via the utilization monitoring system, a value representing at least one of a position of the implement or a load on the implement; determining a value representing a utilization of the implement based on at least one of (i) a comparison between the value representing the position of the implement or the load on the implement and the one or more values representing the operational range of the implement, or (ii) a comparison between a value representing an elapsed time during which an ignition is in a first position and a value representing a duration of time different than the elapsed time; and presenting, via a graphical user interface on a display, the value representing the utilization of the implement.

In some embodiments, determining the value representing the utilization of the implement is based on a quantity of time during which the value representing the at least one of the position of the implement or the load on the implement is above a threshold value.

In some embodiments, the method includes indicating a real-time utilization of a work machine, the real-time utilization of a work machine. In some embodiments, the method includes presenting the value representing utilization of the implement and one or more values representing utilization of work machines within a population of work machines including the work machine.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Work machines such as lifts and telehandlers sometimes require tracking, tasking, monitoring, and servicing at a work site. Managers and operators of working machines typically rely on discrete systems, applications, and methods to perform these functions for each piece of equipment. Often, physical inspection (e.g., hands-on inspection by a person) of a machine is necessary to determine the state, condition, current utilization, and/or prior utilization of the machine. Managers and operators of working machines select the kind and capacity of a working machine to be used based on the anticipated demands of an application. It is therefore desirable to provide a means to quickly and effectively monitor the utilization of a particular machine. The systems and methods described herein facilitate a reliable and efficient utilization monitoring system, which can save time, improve work efficiency, reduce costs, facilitate identification of resources being applied above or below their capacity, determine and develop maintenance strategies based on the particular utilization of the equipment, identify misuse, facilitate improved operator training, and provide data enabling an improved equipment design and development process.

Figure 1:
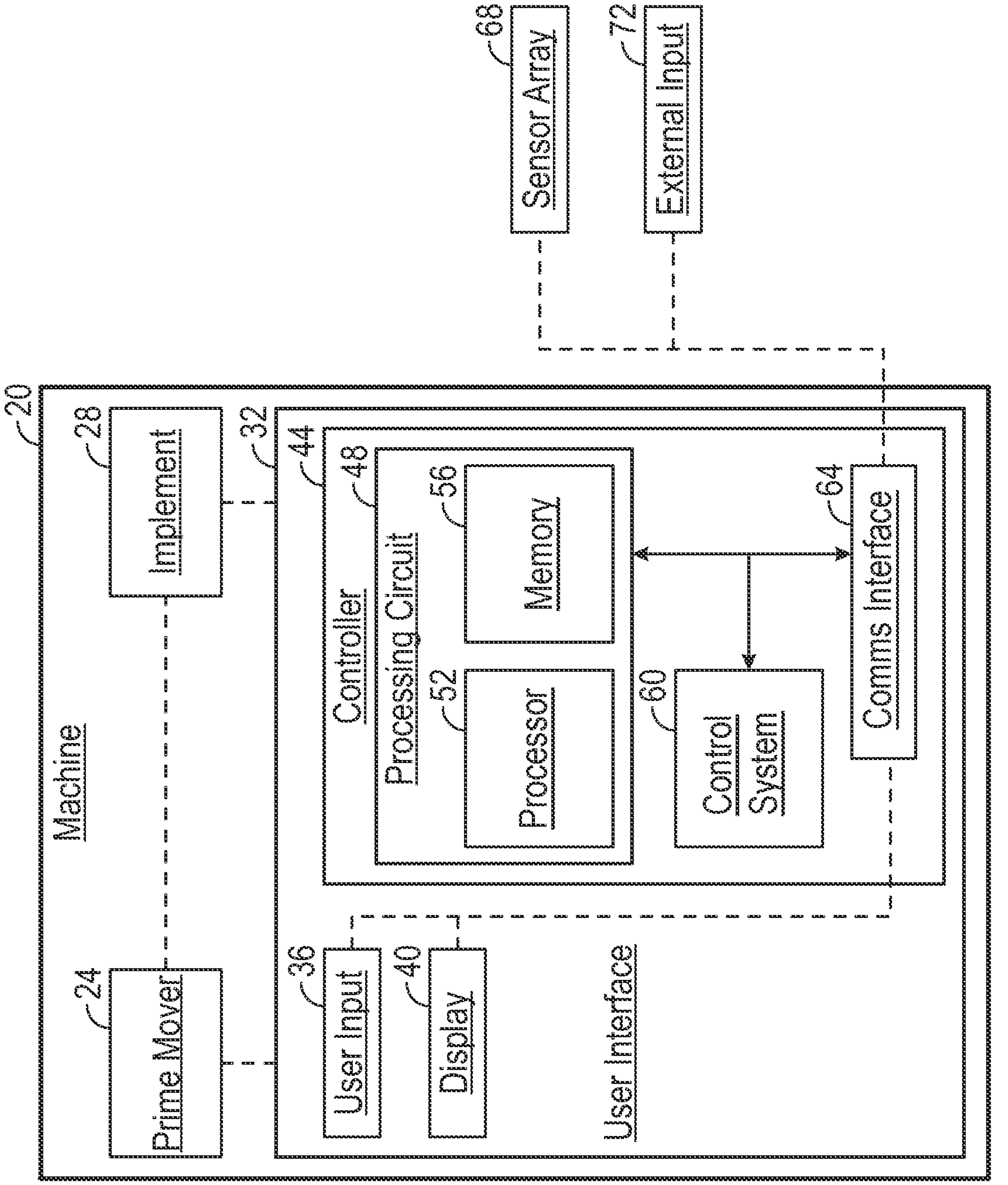
FIG. 1 is a schematic representation of a machine including a utilization monitoring system, according to some embodiments.

As shown in FIG. 1, a work machine 20 (e.g., a telehandler, a boom lift, a scissor lift, forklift, lift equipment, stock picker, dump truck, bulldozer, excavator, drill, loader, skid-steer loader, backhoe loader, etc.) includes a prime mover 24 (e.g., a spark ignition engine, a compression ignition engine, an electric motor, a generator set, a hybrid system, etc.) structured to supply power to the work machine 20 (e.g., electrical power, mechanical power to one or more wheels, etc.), and an implement 28 driven by prime mover 24. In some embodiments, implement 28 is a lift boom, a scissor lift, a telehandler arm, a drilling device, a backhoe, a loader arm, a skid steer loader bucket, etc.

A user interface 32 is arranged in communication with the prime mover 24 and the implement 28 to control operations of the work machine 20 and includes a user input 36 that allows a machine operator to interact with the user interface 32, a display 40 for communicating to the machine operator (e.g., a display screen, a lamp or light, an audio device, a dial, or another display or output device), and a controller 44.

As the components of FIG. 1 are shown to be embodied in the work machine 20, the controller 44 may be structured as one or more electronic control units (ECU). The controller 44 may be separate from or included with at least one of an implement control unit, an exhaust after-treatment control unit, a powertrain control module, an engine control module, etc. In some embodiments, the controller 44 includes a processing circuit 48 having a processor 52 and a memory device 56, a control system 60, and a communications interface 64. Generally, the controller 44 is structured to receive inputs and generate outputs for or from a sensor array 68 and external inputs or outputs 72 (e.g., a load map, a machine-to-machine communication, a fleet management system, an implement operational range database, a user interface, a network, etc.) via the communications interface 64.

The control system 60 generates a range of inputs, outputs, and user interfaces. The inputs, outputs, and user interfaces may be related to a jobsite, a status of a piece of equipment, environmental conditions, equipment telematics, an equipment location, task instructions, sensor data, equipment consumables data (e.g. a fuel level, a condition of a battery), status, location, or sensor data from another connected piece of equipment, communications link availability and status, hazard information, positions of objects relative to a piece of equipment, device configuration data, part tracking data, text and graphic messages, weather alerts, equipment operation, maintenance, service data, equipment beacon commands, tracking data, performance data, cost data, operating and idle time data, remote operation commands, reprogramming and reconfiguration data and commands, self-test commands and data, software as a service data and commands, advertising information, access control commands and data, on-board literature, machine software revision data, fleet management commands and data, logistics data, equipment inspection data including inspection of another piece of equipment using on-board sensors, prioritization of communication link use, predictive maintenance data, tagged consumable data, remote fault detection data, machine synchronization commands and data including cooperative operation of machines, equipment data bus information, operator notification data, work machine twinning displays, commands, implement utilization over time (i.e., past implement utilization, present implement utilization, future and/or anticipated implement utilization), machine utilization over time, jobsite equipment utilization data (e.g., an amalgamation of one or more work machines on a jobsite), data, etc.

The sensor array 68 can include physical and virtual sensors for determining work machine states, work machine conditions, work machine locations, loads, and jobsite location devices. In some embodiments, the sensor array 68 includes a GPS device, a lidar location device, inertial navigation, or other sensors structured to determine one or more values representing a position of the work machine 20 relative to locations, maps, other equipment, objects, or other reference points. In some embodiments, the sensor array 68 includes sensors configured to measure or determine one or more positions of the equipment relative to other portions of the equipment or reference points which are stored and maintained by processing circuit 48. In some embodiments, the sensor values are recorded at time intervals (e.g., 1 second, 1 microsecond, etc.). In some embodiments, the most recent or current sensor value may be compared to one or more prior sensor values stored in memory device 56 to detect changes in position, orientation, location, status, or other criteria. For example, the most recent or current sensor value may be compared to one or more prior sensor values stored in memory device 56 to detect changes in a position of the implement 28 and/or a velocity of the implement 28 relative to a datum (e.g., a home position for the implement 28, a frame or chassis of the work machine 20). In some embodiments, the recorded sensor data is processed using a set of instructions (e.g., instructions stored in memory device 56) to process the stored sensor values into a meaningful equivalent for viewing by a user (e.g., operator, manager, dealer, etc.). For example, electronic sensors (e.g., transducers) may output sensed information in the form of an electronic signal (e.g., voltage, current, analog signal, digital signal, etc.), which may be processed by the processing circuit 48 or by circuitry the sensor itself, to yield meaningful equivalents (e.g., a value representing a position of a terminal end of the implement 28, an implement angle or position relative to another portion of the work machine 20, the temperature of a working fluid, an on/off status, a state of an ignition switch such as an on state or an off state, an operating status of the prime mover 24 such as idle or operating or off, etc.). The meaningful equivalents (e.g., values representative of a state of the work machine 20 and/or implement 28, a value representing utilization of the implement 28) and/or the electronic signals may be viewable or accessible by the machine operator, jobsite administrator, or other user, (e.g., via the user interface 32 or a display 40).

In one configuration, the control system 60 is embodied as a machine or computer-readable media that is executable by a processor, such as processor 52. As described herein and amongst other uses, the machine-readable media facilitates the performance of certain operations to enable the reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer-readable media may include code, which may be written in any programming language, including but not limited to, Java or the like, and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the control system 60 is embodied as hardware units, such as electronic control units. As such, the control system 60 may be embodied as one or more circuitry components including, but not limited to, processing circuitry, network interfaces, peripheral devices, input devices, output devices, sensors, etc. In some embodiments, the control system 60 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the control system 60 may include any type of component for accomplishing or facilitating the achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The control system 60 may also include programmable hardware devices such as field programmable gate arrays, programmable array logic, programmable logic devices or the like. The control system 60 may include one or more memory devices for storing instructions that are executable by the processor(s) of the control system 60. The one or more memory devices and processor(s) may have the same definition as provided below with respect to the memory device 56 and processor 52. In some hardware unit configurations, the control system 60 may be geographically dispersed throughout separate locations in the machine. Alternatively, and as shown, the control system 60 may be embodied in or within a single unit/housing, which is shown as the controller 44.

As shown in FIG. 1, the controller 44 includes the processing circuit 48 having one or more processors, shown as processor 52, and one or more memory devices, shown as memory device 56. The processing circuit 48 may be structured or configured to execute or implement the instructions, commands, and/or control processes described herein with respect to control system 60. The memory device 56 may store instructions, commands, and/or control processes described herein with respect to control system 60. The depicted configuration represents the control system 60 as machine or computer-readable media. However, as mentioned above, this illustration is not meant to be limiting as the present disclosure contemplates other embodiments where the control system 60, or at least one circuit of the control system 60, is configured as a hardware unit. All such combinations and variations are intended to fall within the scope of the present disclosure.

The hardware and data processing components used to implement the various processes, operations, illustrative logics, logical blocks, modules, and circuits described in connection with the embodiments disclosed herein (e.g., the processor 52) may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., control system 60 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 56 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 56 may be communicably connected to the processor 52 to provide computer code or instructions to the processor 52 for executing at least some of the processes described herein. Moreover, the memory device 56 may be or include tangible, non-transient volatile memory or non-volatile memory. Accordingly, the memory device 56 may include database components, object code components, script components, or any other type of information structure for supporting the various activities and information structures described herein.

In an exemplary embodiment, the memory device 56 stores instructions for execution by the processor 52 for a process to automatically generate a work site equipment grouping. The process to automatically generate a work site equipment grouping automatically associates work machines 20 connected on a near network to one or more other work machines 20. In some embodiments, the automatic associations are based on rules stored on a work machine 20 or on another network node. In some embodiments, the association rules are based on one or more of a work site designation, a location of a machine, or a code (e.g. a customer key, a manufacturer key, or a maintainer key).

Figure 2:
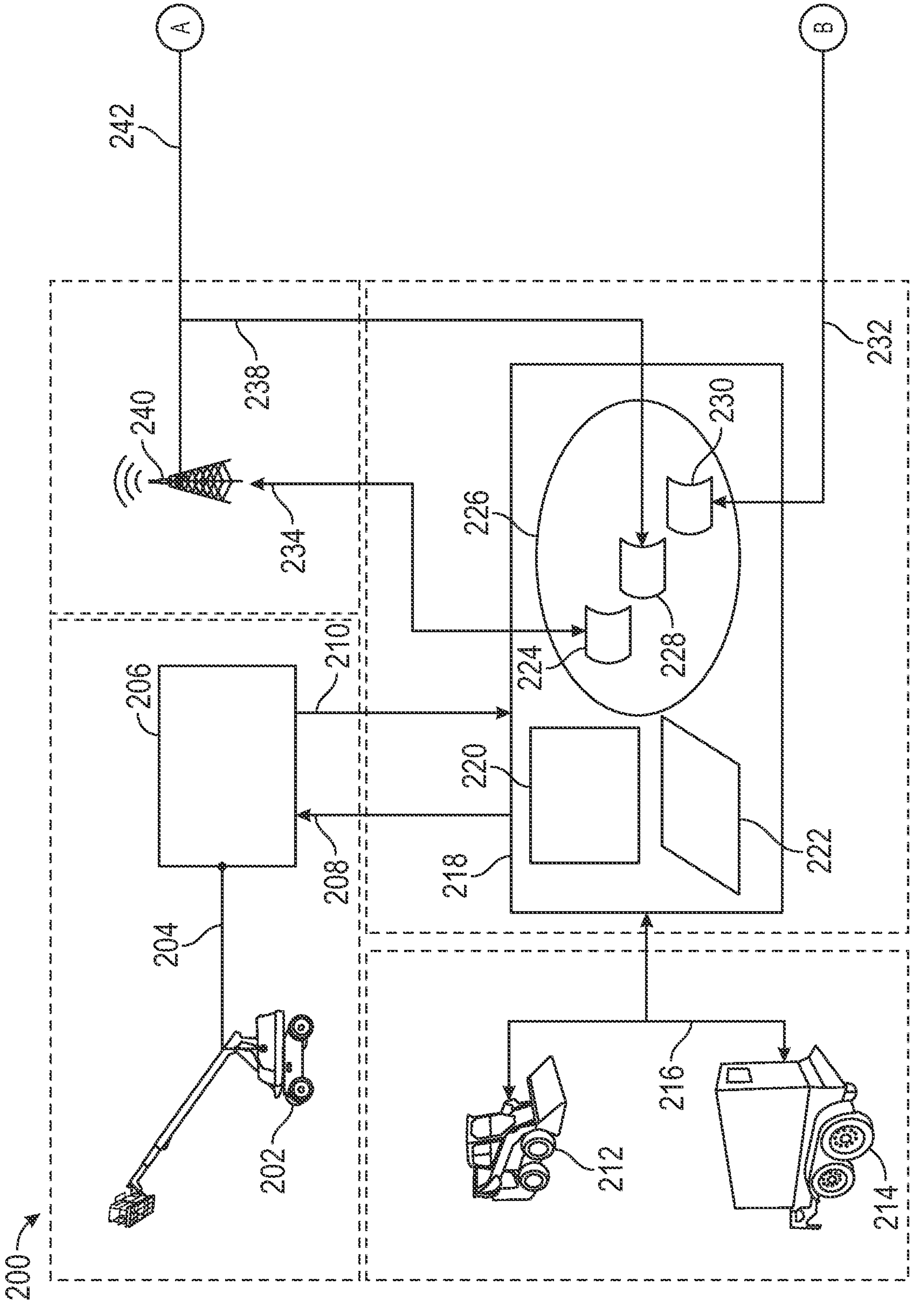
FIG. 2 is a schematic representation of a system including a utilization monitoring system, according to some embodiments.
Figure 2:
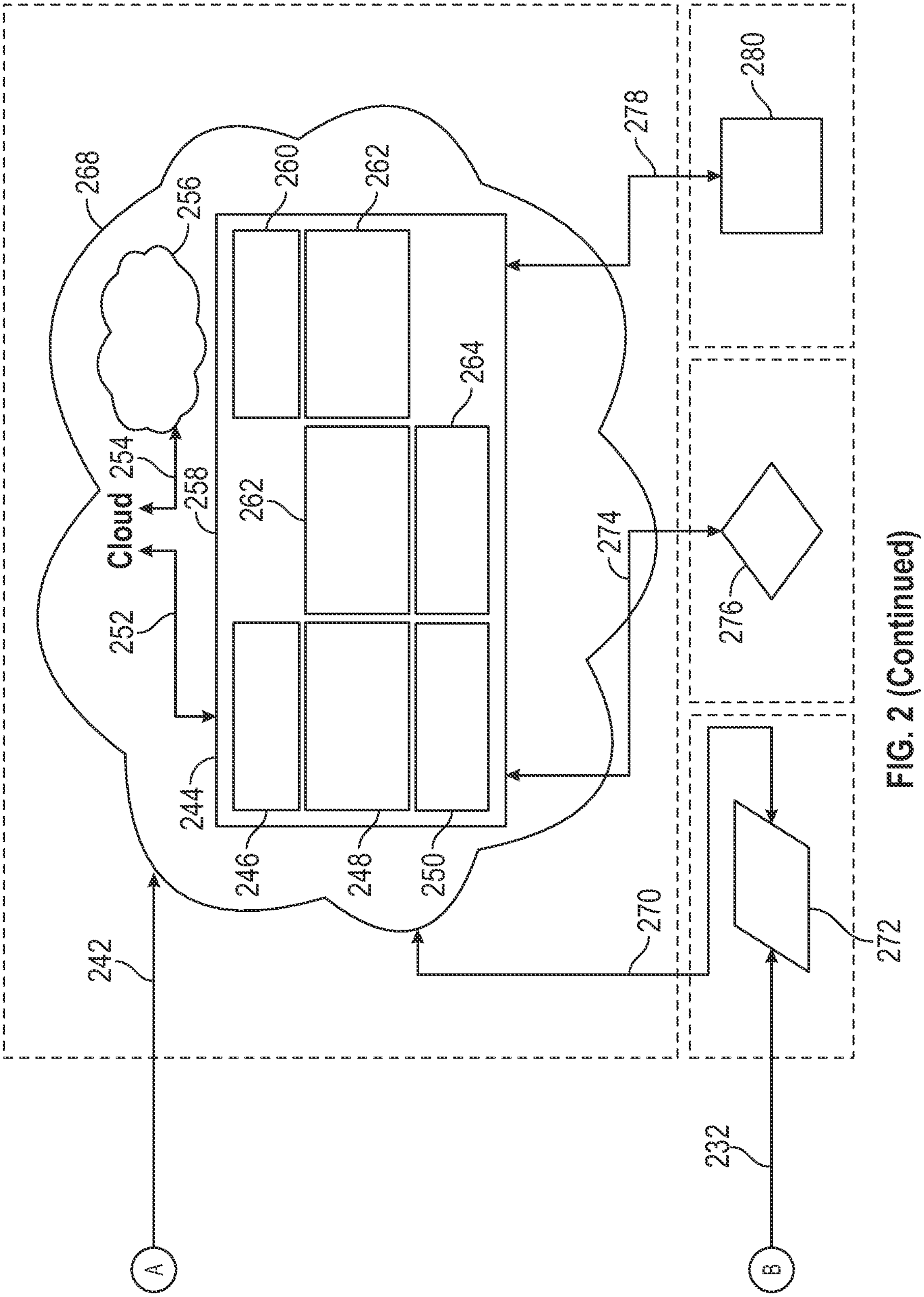

As shown in FIG. 2, a utilization monitoring system 200 may be equipped on one or more work machines 202, each with a control module 206, one or more connectivity modules 218, and one or more networking devices hosting, for example, user interfaces 272, network portals 276, application interfaces/application programming interfaces 280, data storage systems 256, cloud and web services 268, and product development tool and application hubs 244. The work machine 202 may include some or all of the elements and/or functionality described with respect to the work machine 20. Likewise, the work machine 20 may include some or all of the elements and/or functionality described with respect to the work machine 202. The control module 206 may include some or all of the elements and/or functionality described with respect to controller 44 and vice versa. The one or more connectivity modules 218 and user interface 272 may have some or all of the functionality of the communications interface 64 and user interface 32, respectively and/or vice versa.

The work machine 202 is communicably connected 204 to the control module 206. Connectivity 204 between the work machine 202 and the control module 206 may be wired or wireless, thus providing the flexibility to integrate the control module 206 with the work machine 202 or temporarily attach control module 206 to the work machine 202. The control module 206 may be configured or may be reconfigurable in both hardware and software to interface with a variety of work machines 202, 212, and 214. The control module 206 may comprise an integral power source or may draw power from the work machine 202 or another external source of power. Control modules 206 may be installed on or connected to products (e.g., third-party products) 212, 214 not configured by the original product manufacturer with a control module 206.

The control module 206 establishes one or more communications channels 208, 210 with a connectivity module 218. The connectivity module 218 provides a plurality of links between one or more work machines 202, 212, 214 and the utilization monitoring system 200. The connectivity module 218 may be on board a work machine 202 or may be located at a worksite (e.g., at a stationary position near a central location of a worksite). In some embodiments, the connectivity module 218 is a portion of the control module 206. Applications providing functions for the utilization monitoring system 200 may be run by the control modules 206 on one or more work machines 202. The control modules 206 may exchange commands, codes (e.g., a customer key), and data between work machines 202, 212, 214, and user devices 272. Connections between machines and user devices may be provided by a wireless mesh network, for example.

The connectivity module 218 comprises hardware 220, further comprising antennas, switching circuits, filters, amplifiers, mixers, and other signal processing devices for a plurality of wavelengths, frequencies, etc., software hosted on a non-volatile memory components 222, and a communications manager 226. The communications manager 226 may include processing circuits with communications front ends 224, 228, and 230 for one or more signal formats and waveforms including, for example, Bluetooth®, Bluetooth® low energy, WiFi, cellular (e.g., via cellular transmitter 240), optical, and satellite communications. The connectivity module 218 may function as a gateway device connecting work machine 202 to other work machines 212, 214, remote networks 244, 272, 276, and 280, and other networks.

The utilization monitoring system 200 allows for the coordination of multiple work machines 202, 212, 214 within the same work site. In some embodiments, the utilization monitoring system 200 reports utilization for a single work machine 202 within a work site. For example, a work machine 202 equipped with a utilization monitoring system 200 may remotely report the results of utilization for a work machine 202 at a desired interval (e.g., at the end of a work day, weekly, bi-weekly, etc.) to a user via a user device 272. In such an example, the utilization may be used by a user, manager, or data administrator, to monitor the performance of an operator operating the work machine at a remote job site, identify inefficiencies or underutilized capabilities of work machine 202, schedule preventative maintenance based on utilization, collect utilization information for training the operator and other training purposes, and identify misuse (e.g., a load on implement 28 exceeding the maximum load for the implement 28, unauthorized personnel operating the work machine 202, an operator misusing equipment for non-contracted purposes or off the jobsite).

The utilization monitoring system 200 provides connectivity between work machines 202, 212, 214 and remotely hosted user interfaces (e.g., on user device 272), network portals 276, application interfaces/application programming interfaces 280, data storage systems 256, cloud and web services 268, and product development tool and application hubs 244 that function as an Internet of Things (IoT) system for operation, control, and support of work machines 202, 212, 214 and users of work machines. Connections 216, 232, 234, 238, 242, 252, 254, 270, 274, and 278 between nodes connected to the utilization monitoring system 200 may comprise, for example, cellular networks, or other existing or new means of digital connectivity.

Product development tool and application hubs 244 may comprise tools and applications for internal visualizations 246, customer subscription management 248, device provisioning 250, external systems connectors 263, device configuration management 264, user/group permissions 260, asset allocation 262, fleet management, compliance, etc. In some embodiments, application hubs 244 may receive or determine utilization of the equipment from data received from the sensors on-board work machine 202 (e.g., sensor array 68), and/or may receive a control history from the control module 206.

Figure 3:
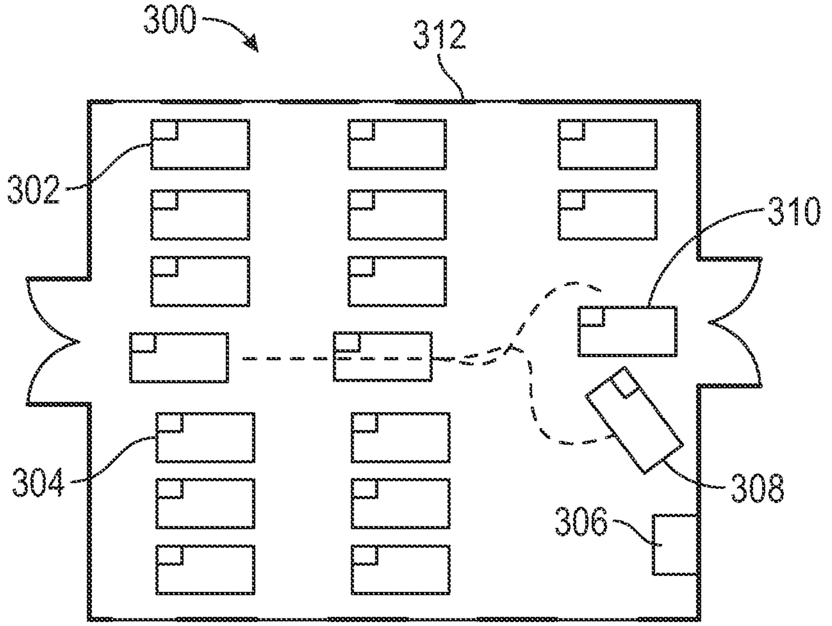
FIG. 3 is a schematic representation of a work site and equipment staging area with equipment having a utilization monitoring system, according to some embodiments.

As shown in FIG. 3, the utilization monitoring system 300 may be deployed on a work site 312 to monitor the utilization of one or more work machines 302, 304. In some embodiments, the utilization monitoring system 300 has some or all of the elements and functionality described with respect to the utilization monitoring system 300. The utilization monitoring system 200 may have some or all of the elements and functionality described with respect to the utilization monitoring system 300. Utilization data may be communicated via the connectivity module 306 to monitor equipment utilization for current and historical tasks. The connectivity module 306 may receive data indicating a task requires more than one work machine 310. For example, utilization monitoring system 300 may monitor and store various sensor values and work equipment information relevant for determining utilization for one or more work machine 302 within the same worksite equipment grouping. For example, the utilization monitoring system 300 may obtain and store task information, client information, customer information, worksite information, operator information, a proximity of a work machine 302 to another work machine 304 during operation and/or completion of a task, a machine location and utilization during a task, a condition of machine location, a machine status, a machine load, commands received by or sent from the controller, and still other information regarding the work machine, jobsite, and tasks performed or to be performed. The utilization monitoring system 300 may record utilization for the current session (e.g., task, deployment, job, etc.) and transmit the utilization and/or data supportive of the utilization determination to a local or remote memory.

Figure 4:
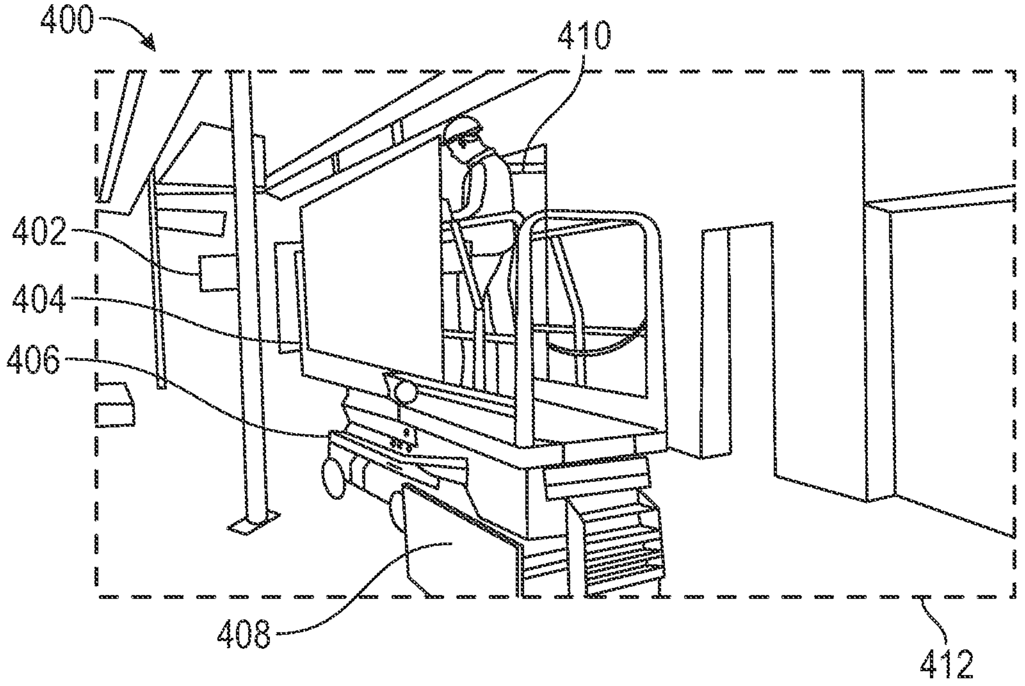
FIG. 4 is a perspective view of a work site with two work machines equipped with a utility monitoring system, according to some embodiments.

In some embodiments, the utilization monitoring system 300 may monitor and record the previous utilization of a work machine 302 for a given task associated with a client, worksite type (e.g., residential, commercial, etc.), operator, proximity to other assigned work machines on the worksite (e.g., within a worksite equipment grouping), and/or other descriptive quantifiable data attributes. In such embodiments, the utilization monitoring system 300 may indicate that a second work machine 304 is needed or desirable for a given task based on the work machine's utilization history or based on a similar work machine's utilization history. For example, as shown in FIG. 4, multiple work machines 406, 408 connected to the utilization monitoring system 400 via connectivity module 402 may collaboratively perform tasks on a jobsite 412 requiring more than one work machine 406, 408, for example, emplacing a section of drywall 404 that is too large to be handled by a single work machine 406, 408. In such an example, the utilization monitoring system 400 may record information related to the task, operator(s), a proximity of the two work machines 406, 408, and/or the individual utilization of each work machine 406, 408. Further, if the utilization monitoring system 400 determines that a second (or third, fourth, fifth, etc.) machine is idle while other machines on the worksite are active, the utilization monitoring system 400 may indicate that the underutilized or unutilized equipment may be unnecessary or that the unused work machine is available for assignment to a task on the jobsite 412.

In some embodiments, the utilization determined by the utilization monitoring system 400 includes a real-time utilization, where utilization is reported or presented (e.g., via a graphical user interface on a display of the user device 272) based on the work machine's immediate (e.g., most recent) state and/or other criteria at the time utilization is requested from the utilization monitoring system 400. In some embodiments, utilization may include one or more utilization data points (e.g., utilization data values, utilization values, etc.) over a period of time (e.g., as selected by the user). For example, a user may generate and/or request a real-time utilization report using a mobile application (e.g., user device 272), and the utilization monitoring system 400 may be configured to output and/or present stored utilization data according to the request. In some embodiments, the utilization monitoring system 400 may have some or all of the elements and functionality described with respect to the utilization monitoring system 300, and vice versa.

In some embodiments, the utilization monitoring system 400 may aid the owner, manager, or operator with tasking, selecting, and allocating equipment to a task and/or jobsite. For example, if a 185-foot telescoping boom lift, such as the JLG® 1850SJ Ultra Series Telescopic Boom Lift, is indicated by the utilization monitoring system 400 as consistently operating at 5% of its capacity (e.g., 5% of its weight capacity, 5% of its load capacity, 5% of its height capacity, 5% of its speed capacity, 5% of its reach capacity, etc.) while an 80-foot telescoping boom lift, such as the JLG® 800S Telescopic Boom Lift, is indicated by the utilization monitoring system 400 as operating at 100% of its capacity on the same worksite, the operator and/or manager may swap the 185-foot telescoping boom lift with the 80-foot telescopic boom lift, at least partially based on indications from the utilization monitoring system 400. In some embodiments, the utilization monitoring system 400 may automatically reallocate equipment. For example, if work machine 202 is determined to be operating above a threshold value (e.g., a threshold value for utilization such as 95% height utilization or 95% load utilization, etc.), the utilization monitoring system 400 may automatically reallocate or substitute the work machine 202 for higher capacity work equipment if available, or recommend different work machines or implements be added to the jobsite. In some embodiments, the utilization monitoring system 400 may indicate utilization over 100%. For example, if the work equipment is being operated outside of an operational range of the work equipment (e.g., a rated capacity, a manufacturer limit, a predetermined range, etc.) the utilization may be indicated as being over 100%. As another example, if the user is supplying commands to the work machine 408 which would, if executed, cause the machine 408 to operate beyond its limits (e.g., maximum height, maximum reach, maximum load, etc.), the utilization monitoring system 400 may indicate a utilization greater than 100%. As another example, if a user or an operator of an 80-foot telescoping boom lift, physically limited to an 80-foot maximum implement (e.g., platform) height, supplies a command to the boom lift to extend beyond a height of 80 feet, the utilization monitoring system 400 may indicate equipment utilization as greater than 100% (e.g., 100%+) and the utilization monitoring system 400 may notify a user (e.g., notify via text, via email, via a notification on a user device, etc.), or otherwise record the equipment utilization as being over 100%. Although utilization is expressed as a percentage in the examples above, other equivalents for representing a comparison between a value of a variable representing a condition of the implement 28 (e.g., an extension height, a platform height, a load, a rotational speed, etc.) and a value representing a limit of an acceptable range, are possible. As a non-limiting example, color scales, smiley faces, ratios, pie charts, numerical scales, plots, and still other representations are contemplated.

In some embodiments, the operator supplies an input to the utilization monitoring system 400 to designate task or session information, such as the kind and type of task or work being performed (e.g., painting, framing, lifting, emplacing drywall, etc.). In other embodiments, the task information is supplied to the utilization monitoring system 400 by someone other than the operator (e.g., manager, owner, etc.), an external source, or is not provided to the utilization monitoring system 400.

Figure 5:
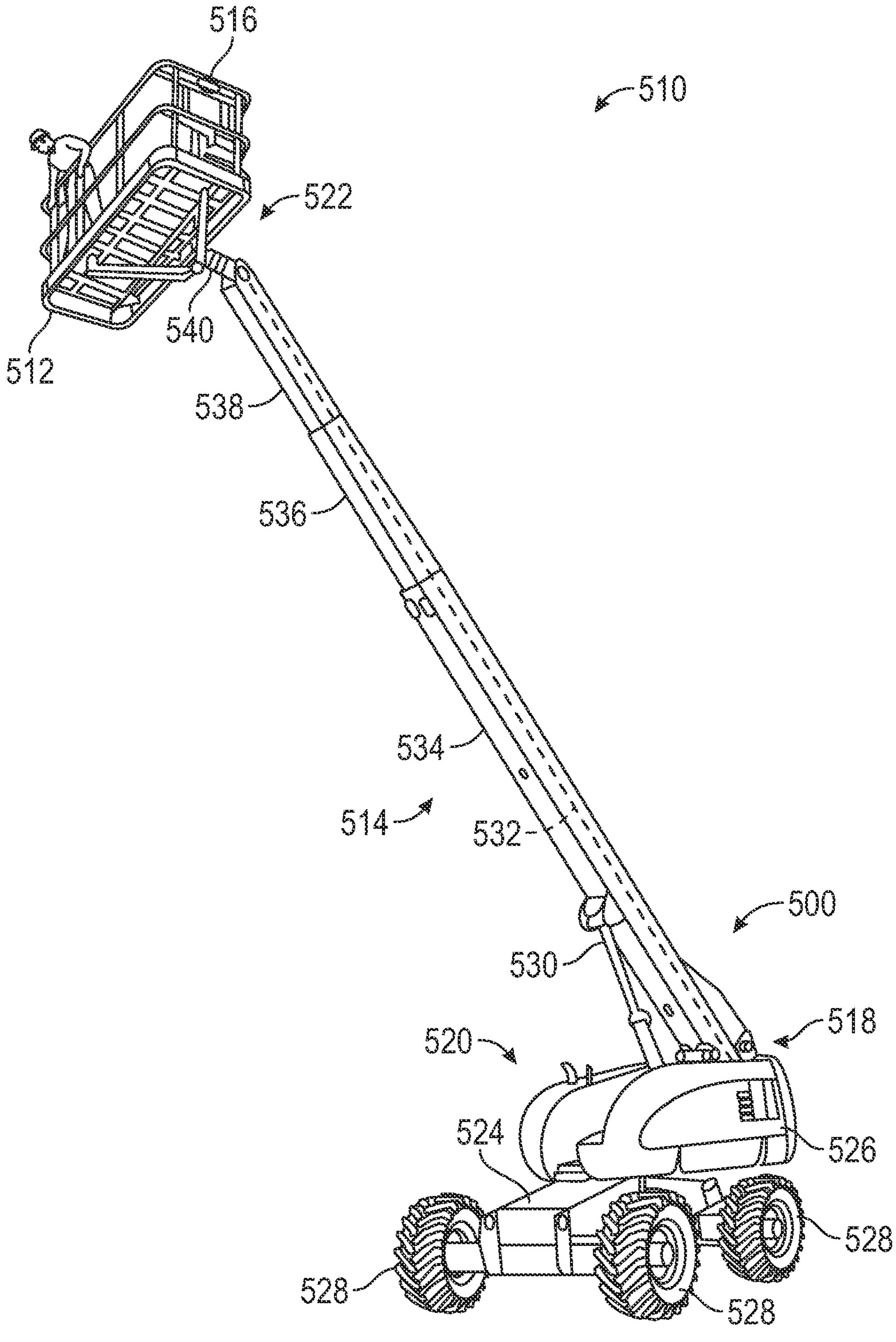
FIG. 5 is a perspective view of a telescoping boom lift with a utility monitoring system equipped, according to some embodiments.

As shown in FIG. 5, work equipment in a telescoping boom lift configuration with a utilization monitoring system 500 is shown as boom lift 510. The utilization monitoring system 500 may have some or all of the elements and functionality described with respect to the utilization monitoring system 400, and vice versa. For example, the boom lift 510 may have some or all of the elements and functionality of the work equipment 402, and vice versa. Boom lift 510 includes a chassis or ground console, shown as chassis 520, and an implement (e.g., a work platform, forks, a bucket, drill, etc.), shown as platform 512. The platform 512 is coupled to the chassis 520 by a boom assembly, shown as boom 514. In some embodiments, platform 512 supports one or more workers or operators. In some embodiments, the boom lift 510 includes an accessory or tool, shown as welder 516, coupled to the platform 512 for use by the worker. In other embodiments, the platform 512 is equipped with other tools for use by a worker, including pneumatic tools (e.g., impact wrench, airbrush, nail guns, ratchets, etc.), plasma cutters, and spotlights, among other alternatives. In other embodiments, the boom lift 510 includes a different implement coupled to the boom 514 (e.g., a saw, drill, jackhammer, lift forks, etc.) in place of or in addition to the platform 512. Accordingly, the boom lift 510 may be configured as a different type of lift device, such as a telehandler, a vertical lift, etc.

The boom 514 has a first or proximal end 518 pivotally coupled to the chassis 520 and a second or distal end 522 opposite the proximal end 518. The distal end 522 is pivotally coupled to the platform 512. By pivoting the boom 514 at the proximal end 518, the platform 512 may be elevated or lowered to a height above or below a portion of the chassis 520. The boom 514 has multiple telescoping segments that allow the distal end 522 and the platform 512 to be moved closer to or away from the proximal end 518 and the chassis 520.

As shown in FIG. 5, chassis 520 includes a chassis, base, or frame, shown as base frame 524. The base frame 524 is coupled to a turntable 526. According to an exemplary embodiment, the proximal end 518 of the boom 514 is pivotally coupled to the turntable 526. According to some embodiments, the chassis 520 does not include a turntable 526, and the boom 514 is coupled directly to the base frame 524 (e.g., the boom 514 may be provided as part of a telehandler). According to still another alternative embodiment, the boom 514 is incorporated as part of an articulating boom lift that includes multiple sections coupled to one another (e.g., a base section coupled to the chassis 520, an upper section coupled to the platform 512, and one or more intermediate sections coupling the base section to the upper section, etc.).

As shown in FIG. 5, the boom lift 510 is mobile, and the base frame 524 includes tractive elements, shown as wheel and tire assemblies 528. The wheel and tire assemblies 528 may be driven using a prime mover (e.g., prime mover 24) and steered to maneuver the boom lift 510. In other embodiments, the base frame 524 includes other devices to propel or steer the lift device 10 (e.g., tracks). In still other embodiments, the boom lift 510 is a trailer that is towed by another vehicle, and the base frame 524 includes one or more wheels or elements configured to support the boom lift 510. In still other embodiments, the boom lift 510 is a stationary device, and the base frame 524 lacks any wheels or other elements to facilitate the movement of the boom lift 510 and may instead include legs or other similar structures that facilitate stationary support of the boom lift 510.

Figure 6:
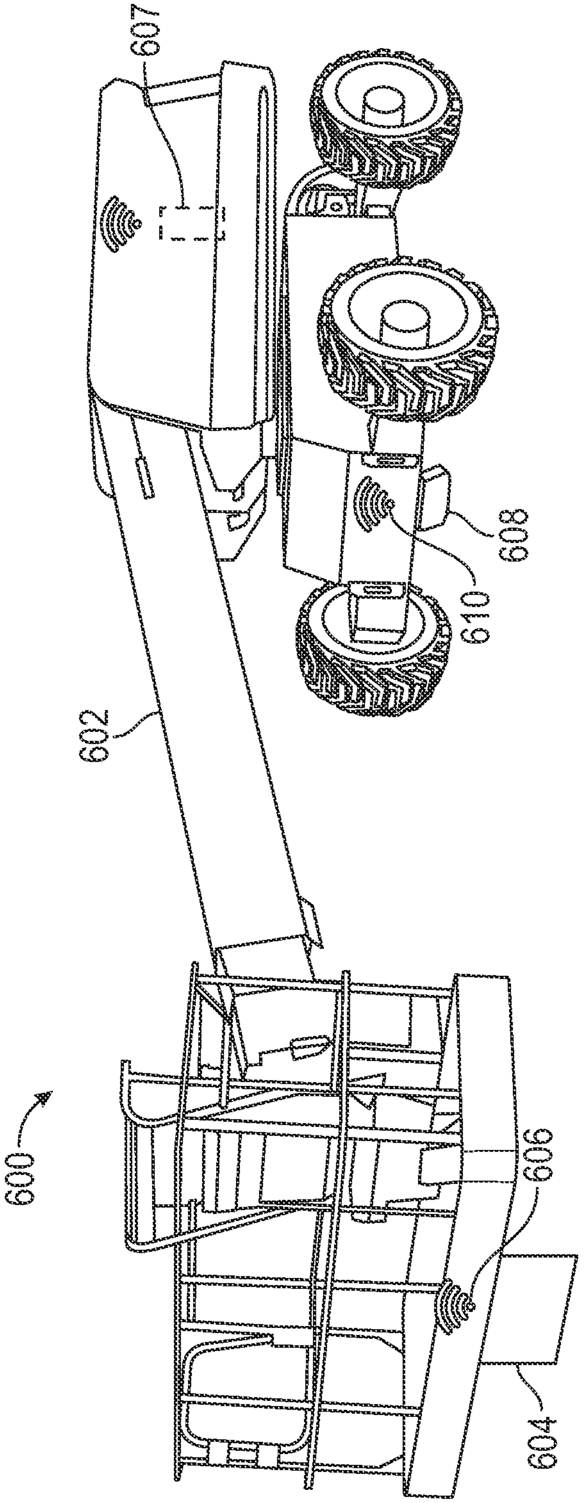
FIG. 6 is a perspective view of a work machine with a utility monitoring system equipped, according to some embodiments.

As shown in FIG. 6, a telescoping boom lift 602 is equipped with a utilization monitoring system 600. The utilization monitoring system 600 may have some or all of the elements and functionality described with respect to the utilization monitoring system 500, and vice versa. For example, the telescoping boom lift 602 may have some or all of the elements and functionality of the boom lift 510 and vice versa. The telescoping boom lift 602 has a sensor cluster 604 wirelessly connected 606 to the controller 607 and a second sensor cluster 608 wirelessly connected 610 to the controller 607. Sensor clusters 604, 608 may include proximity sensors, temperature sensors, accelerometers, pressure sensors, light sensors, IR sensors, weight sensors, gyroscopic sensors, and still other suitable sensors for use with the utilization monitoring system 600. In some embodiments, the sensor clusters 604, 612 are configured to detect the presence of an operator positioned within the operator platform (e.g., using a light sensor, using an IR sensor, using a weight sensor, etc.) or movement of the machine (e.g., using an accelerometer or gyroscopic sensor) which may indicate active utilization of the machine, thereby causing the utilization monitoring system 600 to record relevant characteristics such as a platform load, a duration of time, user commands, electrical loads, hydraulic loads, machine location, position, and orientation conditions, and still other characteristics for monitoring equipment utilization.

Figure 7:
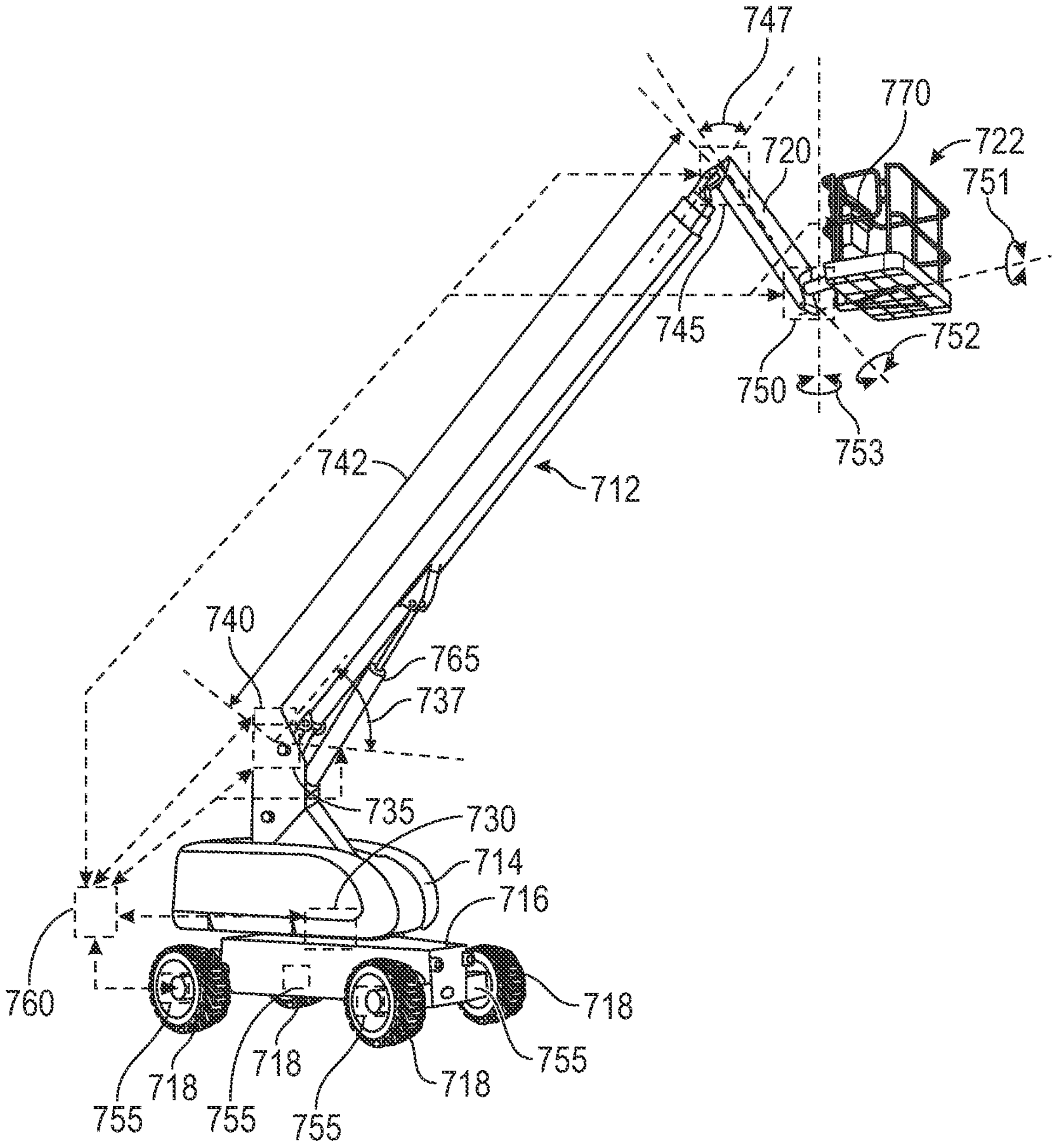
FIG. 7 is a perspective view of a telescoping boom lift with a utility monitoring system equipped, according to some embodiments.

As shown in FIG. 7, a telescoping boom lift 710 is equipped with a utilization monitoring system 700. The utilization monitoring system 700 may have some or all of the elements and functionality described with respect to the utilization monitoring system 600, and vice versa. For example, the telescoping boom lift 710 may have some or all of the elements and functionality of the telescoping boom lift 602, and vice versa. The telescoping boom lift 710 includes sensors at various locations on the telescoping boom lift 710 configured to determine and detect the current position and/or status of the telescoping boom lift 710. The telescoping boom lift 710 includes boom assembly 712, base assembly 714, chassis 716, wheels 718, platform arm 720, and platform 722. As stated above, the telescoping boom lift 710 may have similar features as boom lift 510 and vice versa. As shown, telescoping boom lift 710 includes a first sensor, shown angular position sensor 730, a second sensor, shown as boom angle sensor 735, a third sensor, shown as boom extension sensor 740, a fourth sensor, shown as platform arm angle sensor 745, a fifth sensor, shown as platform sensor 750, and tractive element sensors, shown as wheel sensors 755.

In some embodiments, the angular position sensor 730 is configured to detect the angular position of the boom assembly 712 relative to the chassis 716 as base assembly 714 rotates on chassis 716. Boom angle sensor 735 may be configured to measure boom angle 737. Boom angle 737 may be defined as an angle between the boom assembly and a horizontal plane. Boom extension sensor 740 may be one or more sensors configured to detect boom extension. Boom extension may be defined as the change in length 742 of boom assembly 712 from a nested position (e.g., as in FIG. 7) to an extended position (e.g., as in FIG. 5). Platform arm angle sensor 745 may be configured to detect the platform arm angle 747. The platform arm angle 747 may be defined as the angle between a longitudinal axis of platform arm 720 and a longitudinal axis of the boom assembly 712. Platform sensor 750 may be one or more sensors configured to detect the roll 751, pitch 752, and yaw 753 of platform 722 relative to the platform arm 720 or chassis 716. In some embodiments, platform sensor 750 is configured to sense the load (e.g., weight) supported by platform 722. Wheel sensors 755 may be configured to detect the angular rotation of wheels 718 and/or the angular offset between the respective planes containing wheels 718 to determine the direction of travel and/or wheel 718 position relative to the chassis 716. Sensors 730, 735, 740, 745, 750, 755 may be communicably coupled with controller 760 by a wired or wireless connection. In some embodiments, one or more sensors 730, 735, 740, 745, 750, 755 may be part of an actuator. For example, boom angle sensor 735 may be part of hydraulic actuator 765, which may indirectly measure boom angle 737 by determining the extension of the hydraulic actuator 765. In an exemplary embodiment, sensors 730, 735, 740, 745, 750, 755 may be used to determine the position of the platform 722 relative to the chassis 716.

The sensors 730, 735, 740, 745, 750, 755 may be substantially similar to or different than the sensors of sensor array 68. In some embodiments, sensors 730, 735, 740, 745, 750, 755 include inductive angle sensors, weight sensors, proximity sensors, pressure sensors, hydraulic sensors, strain gauges, magnetostrictive sensors, variable-resistance sensors, variable inductance sensors, and still other suitable sensors for monitoring the status, utilization, and other criteria of work equipment, all in communication with controller 760. Controller 760 may be substantially similar to or different than controller 44. In some embodiments, sensors 730, 735, 740, 745, 750, 755 are configured to directly or indirectly measure positional characteristics of the telescoping boom lift 710.

As shown in FIG. 7, utilization monitoring system 700 may monitor or record positions 732, 737, 742, 747, 752, 757 based on commands sent from the controller 760 to actuators (e.g., hydraulic actuator 765) on the telescoping boom lift 710 with or without the need for sensors 730, 735, 740, 745, 750, 755. In some embodiments, the utilization monitoring system 700 may monitor or record the positions 732, 737, 742, 747, 752, 757 based on inputs from one or more control panels (e.g., platform control panel 770). In some embodiments, the utilization monitoring system 700 records positions 732, 737, 742, 747, 752, 757 using a combination of values received from sensors 730, 735, 740, 745, 750, 755 and received controller commands (e.g., originating from machine operator input).

In some embodiments, utilization includes one or more values representing a utilization measured on a time basis. For example, the utilization monitoring system 700 may record an elapsed time by starting a timer while recording sensor 730, 735, 740, 745, 750, 755 values when controller 760 receives an indication of the prime mover operating (e.g., prime mover 24) or the telescoping boom lift 710 operating (e.g., powered, moving, loaded, etc.). In some embodiments, the utilization monitoring system 700 may determine an elapsed time during which the telescoping boom lift 710 is operating above or below a threshold value (e.g., implement height more than 5 feet above the ground), user inputs (e.g., user inputs 36) are being sent to the controller 760, commands are being sent to the prime mover (e.g., prime mover or the implement from the controller or user interface (e.g., platform control panel 770), a machine ignition or kill switch or another multi-state input device is in an operation enabling state (e.g., an operational or powered position, a run position, an on position, etc.), wheel sensors 755 indicate the telescoping boom lift 710 is moving or other indications of the telescoping boom lift 710 being operated.

In some embodiments, the utilization monitoring system 700 may begin a timer when the telescoping boom lift 710 is electronically unlocked by a user (e.g., using an RFID tag, passcode, etc.) or when a key is inserted into the ignition or the telescoping boom lift 710 is powered on. The utilization monitoring system 700 may stop a timer and pause or stop monitoring sensor 730, 735, 740, 745, 750, 755 values when the controller 760 receives an indication that the ignition is in an off position (e.g., a non-operational or unpowered position), or when the vehicle is in a stored or home position (e.g., as defined by a platform 722 position relative to the chassis 716 and/or a position of the chassis 716 relative to a point of reference system such as GPS). In some embodiments, the telescoping boom lift 710 has one or more home positions. For example, the telescoping boom lift 710 may be in a stored or home position with the platform 722 in a raised position (e.g., as in FIG. 7) to prevent unwanted tampering with the telescoping boom lift 710 on a jobsite, and another stored or home position with the platform 722 in a lowered position (e.g., as in FIG. 6) when stored indoors or other circumstances. In some embodiments, an operator may control the boom assembly 712 using a base control panel (e.g., base control panel 914 shown in FIG. 9) to position the telescoping boom lift 710 in the home position. In some embodiments, the utilization monitoring system 700 may start or stop a timer and/or may start or stop recording sensor 730, 735, 740, 745, 750, 755 values based on the equipment being in the home position. In an exemplary embodiment, the utilization monitoring system 700 starts a second timer when the ignition is in the off position or when the telescoping boom lift 710 is in the home position and stops the second timer when the ignition is turned to the on position or the telescoping boom lift 710 leaves the home positon. In an exemplary embodiment, the utilization monitoring system 700 starts a second timer when the work equipment is in a home or stored position. The second timer may be used to measure the duration of time that the work machine is unutilized.

In some embodiments, utilization is monitored and determined at least partially on a position basis. As shown in FIG. 7, the utilization monitoring system 700 may record and monitor positions and orientations of various components (e.g., boom assembly 712, platform arm 720, wheels 718, chassis 716, platform 722, base assembly 714, etc.) of the telescoping boom lift 710 and compare the monitored and stored positions and orientations to their respective maximum values (e.g., maximum boom extension, maximum platform pitch 752, maximum platform roll 751, maximum platform yaw 753, maximum boom angle 737, etc.) or to other criteria. The monitored and stored positions and orientations may be compared to their respective maximums to determine utilization as a percentage of machine capacity. In an exemplary embodiment, a weighted average may be used to determine one or more values representing an overall utilization of the telescoping boom lift 710. The weights used in the weighted average may be entered by a user of the utilization monitoring system 700, or may be preprogrammed by the manufacturer of the utilization monitoring system 700. For example, overall utilization may be determined based on an average or weighted average of platform 722 height, prime mover load, boom length 742, and a duration of time the equipment is being utilized compared to a different period of time (e.g., per hour, per day, per week, per year, etc.), each compared to their respective maximum values. In other embodiments, other weighting and/or evaluation techniques and criteria may be used to determine utilization.

Figure 8:
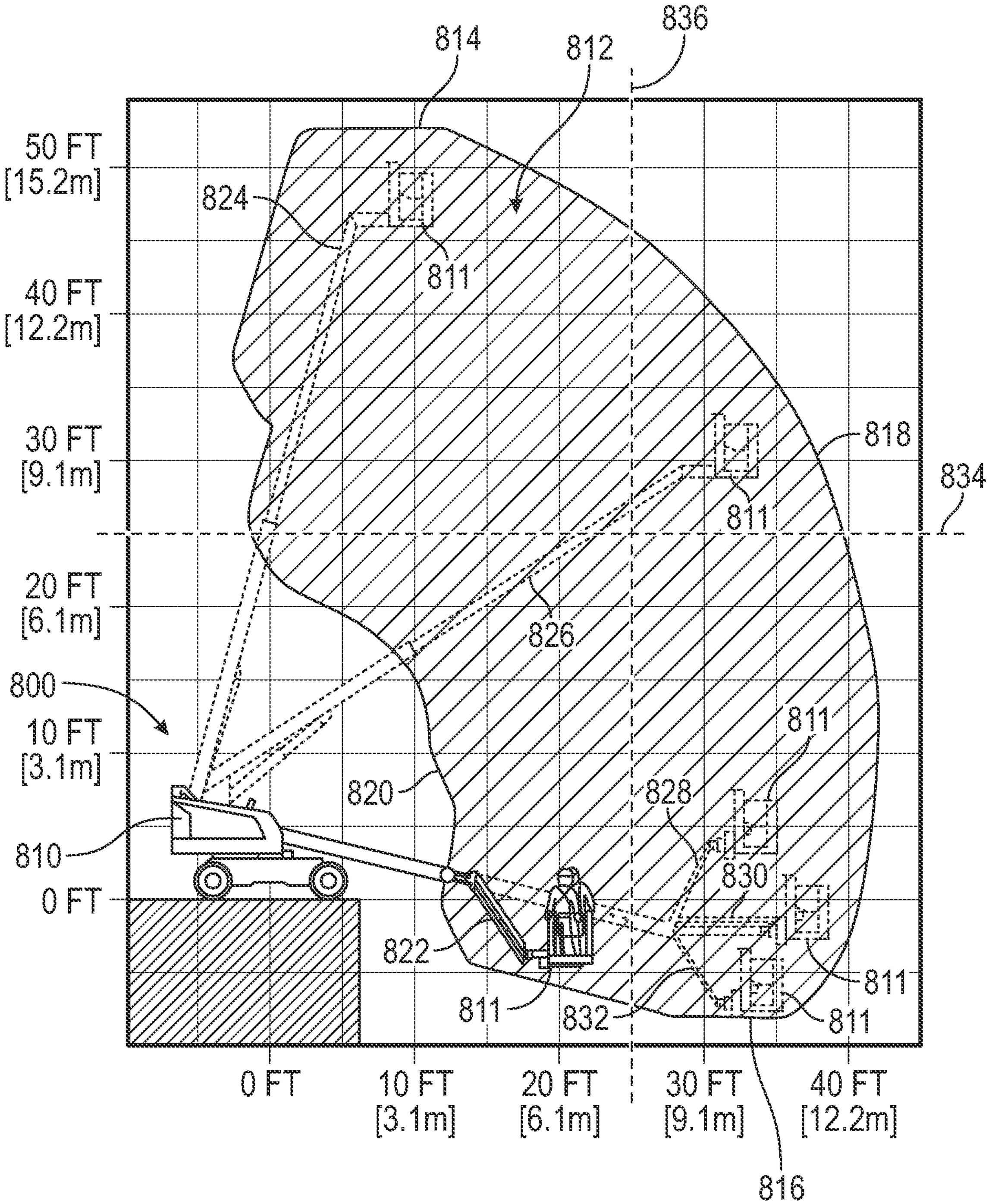
FIG. 8 is a schematic representation of a telescoping boom lift with a utility monitoring system equipped showing a work area of the telescoping boom lift, according to some embodiments.

As shown in FIG. 8, a work machine, shown as telescoping boom lift 810, is equipped with a utilization monitoring system 800. The utilization monitoring system 800 may have some or all of the elements and functionality described with respect to the utilization monitoring system 700, and vice versa. For example, the boom lift 810 may have some or all of the elements and functionality of the telescoping boom lift 710, and vice versa. The operational range or working range of the implement (e.g., working area, working space, rated area, rated range, manufacturer specified range, etc.) is shown as work area 812. Work area 812 is bounded by an upper limit 814, a lower limit 816, an outer limit 818, and an inner limit 820. Limits 814, 816, 818, 820 are physical limitations or programmed limitations of the telescoping boom lift 810. The upper limit 814 may be the maximum height of the telescoping boom lift 810. The lower limit may be the minimum height of the telescoping boom lift 810. The outer limit 818 may be the maximum reach of the telescoping boom lift 810. The inner limit 820 may be the minimum reach of the telescoping boom lift 810. The limits 814, 816, 818, 820 vary based on the reach and height of the configuration and loading condition of the telescoping boom lift 810. In some embodiments, the maximum load capacity (e.g., weight capacity, hoist capacity, etc.) is a function of the reach and/or height of the telescoping boom lift 810 and the work area 812 may be shaped differently depending on the platform 811 load (e.g., the weight of operators, materials, occupants, payload, etc.) to prevent the telescoping boom lift 810 from tipping. For example, the outer limit 818 may be closer to the inner limit 820 for a load heavier than the load of the illustration shown in FIG. 8. In this way, the utilization monitoring system 800 may prevent the telescoping boom lift 810 from tipping.

In some embodiments, the utilization monitoring system 800 calculates utilization based on the position of the platform 811 within the work area 812. As shown in FIG. 8, platform 811 is movable between a first position 822, a second position 824, a third position 826, a fourth position 828, a fifth position 830, and a sixth position 832. The first position 822 is near the lower limit 816 and the inner limit 820, the second position 824 is near the upper limit 814 and the outer limit 818, the third position 826 is located near the outer limit 818, the fourth position 828 and fifth position 830 are located near the lower limit 816 and the outer limit 818. The sixth position 832 is located on the lower limit 816. In some embodiments, the utilization monitoring system 800 may calculate utilization based at least partially on a time the platform 811 is on or near one or more of limits 814, 816, 818, 820 of the work area 812. For example, the utilization monitoring system 800 may indicate utilization of the telescoping boom lift 810 in first position 822 is less than in the sixth position 832 based on the platform 811 having a closer proximity to the outer limit 818 in the sixth position 832 than in the first position 822. In some embodiments, the utilization monitoring system 800 calculates utilization based on a time above or below a threshold value or a position above or below a threshold value. For example, as shown in FIG. 8, work area 812 includes a height threshold 834 and a reach threshold 836. In such an example, the utilization monitoring system 800 may calculate the utilization of the equipment based at least partially on the threshold values 834, 836. In some embodiments, the threshold values 834, 836 may be functions of equipment height and equipment reach. Additionally, while the work area 812 is shown two dimensionally, the work area 812 may be one dimensional (e.g., a line) or three dimensional (a space). In some embodiments, the shape of the work area 812 is based on the degrees of freedom of the platform 811 relative to the chassis of the boom lift 810.

Figure 9:
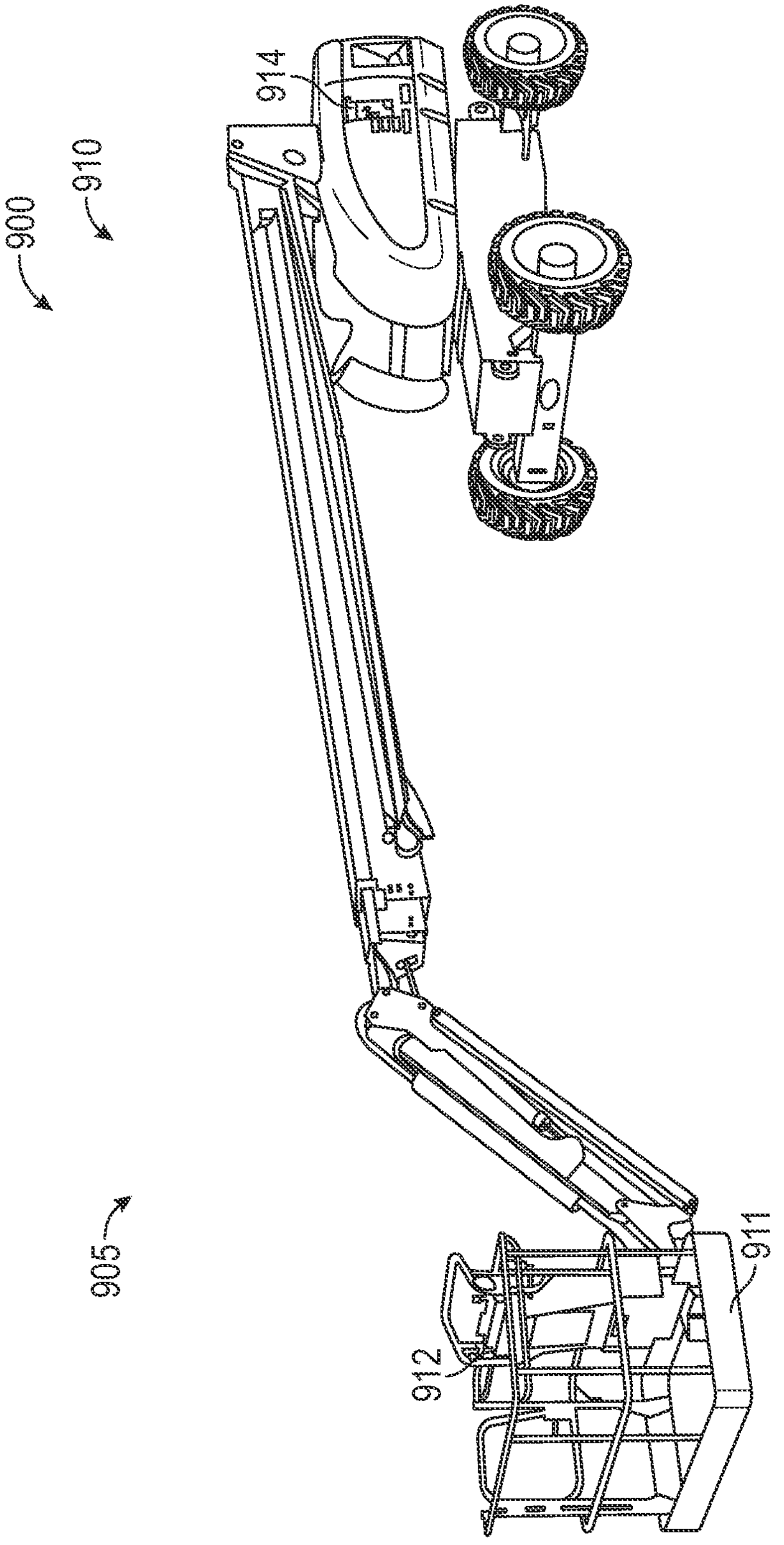
FIG. 9 is a perspective view of a telescoping boom lift in a lowered position with a utility monitoring system equipped, according to some embodiments.

As shown in FIG. 9, a boom lift 910 is equipped with a utilization monitoring system 900 and is shown in a lowered position 905. The utilization monitoring system 900 may have some or all of the elements and functionality described with respect to the utilization monitoring system 800, and vice versa. For example, the boom lift 910 may have some or all of the elements and functionality of the telescoping boom lift 810, and vice versa. As stated above, the boom lift 910 and the utilization monitoring system 900 may be the same as or different than the telescoping boom lift 710 and utilization monitoring system 700. An operator of the boom lift 910 may enter the platform 911 while the boom lift 910 is in the position shown (e.g., a lowered position). The operator may control the boom lift 910 using the platform control panel 912 or the base control panel 914. In some embodiments, the utilization monitoring system 900 may monitor and record utilization upon the operator entering the platform 911 by detecting a weight being added to the platform 911. In some embodiments, the utilization monitoring system may monitor and record utilization before and/or after an operator enters the platform 911.

Figure 10:
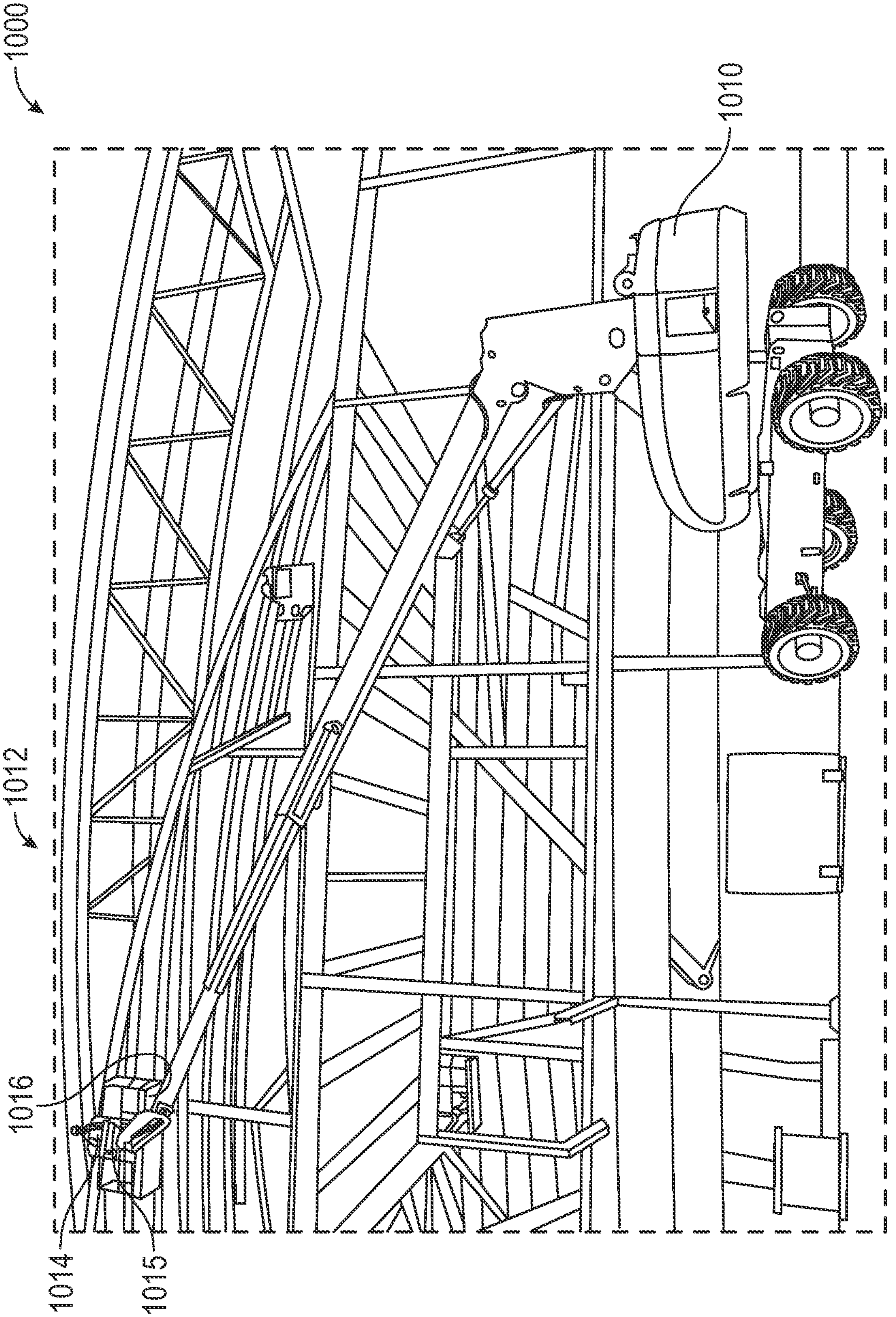
FIG. 10 is a perspective view of a telescoping boom lift in a raised position with a utility monitoring system equipped, according to some embodiments.

As shown in FIG. 10, a boom lift 1010 is equipped with a utilization monitoring system 1000. The utilization monitoring system 1000 may have some or all of the elements and functionality described with respect to the utilization monitoring system 900, and vice versa. For example, the boom lift 1010 may have some or all of the elements and functionality of the boom lift 910, and vice versa. The boom lift 1010 is shown in a raised position 1012. An operator 1014 is operating the boom lift 1010 using the platform controls 1015 on the platform 1016, and the utilization monitoring system 1000 is recording utilization values and related data of the boom lift 1010 (e.g., boom height utilization, command history, loads, sensor values, user inputs, controller outputs, elapsed time, operator information, worksite information, task information, manager information, equipment location, equipment position, etc.).

Figure 11:
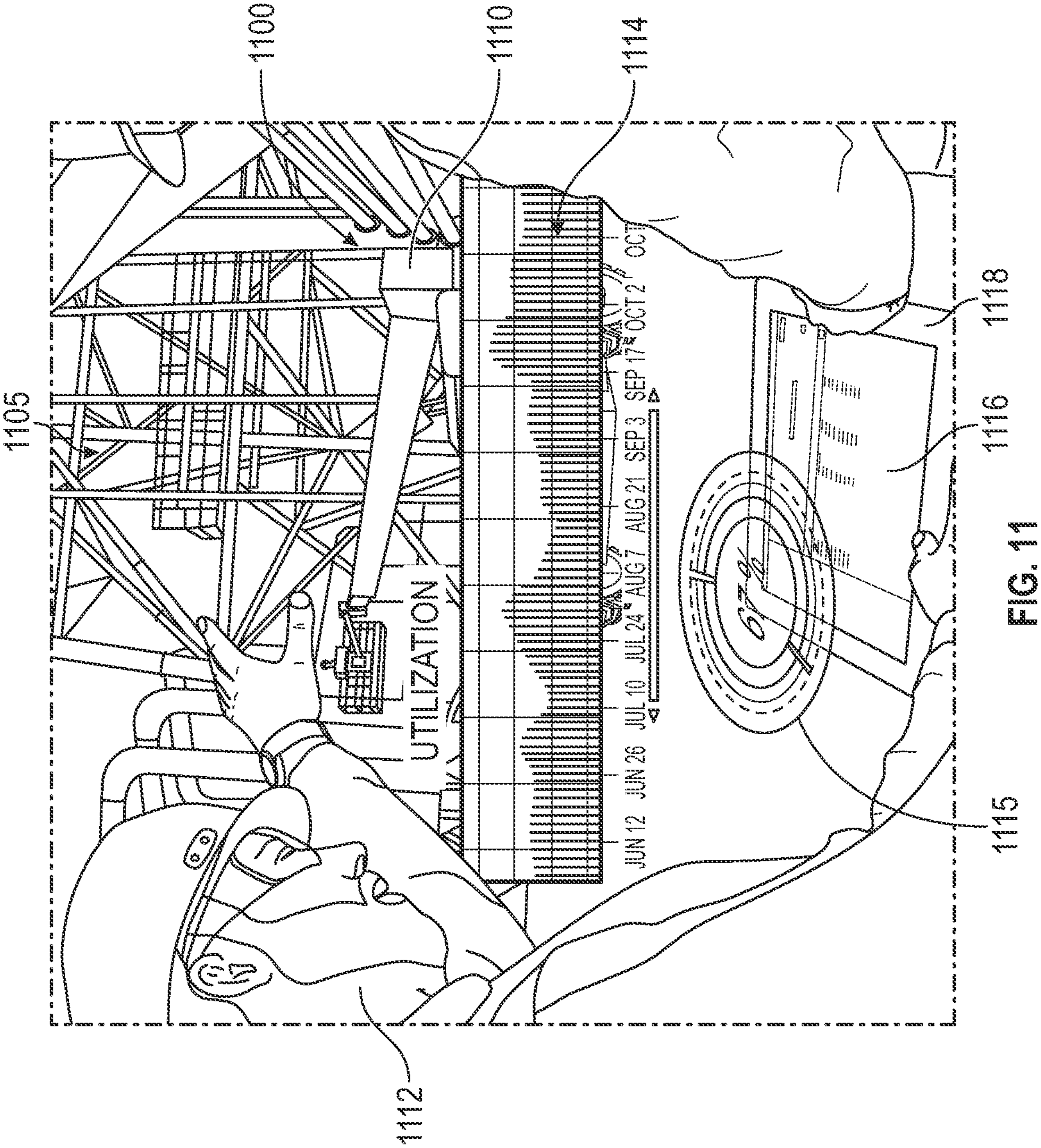
FIG. 11 is a perspective view of a telescoping boom lift at a work site with a utilization monitoring system equipped, according to some embodiments.

As shown in FIG. 11, a boom lift 1110 is equipped with a utilization monitoring system 1100 on a worksite 1105. The utilization monitoring system 1100 may have some or all of the elements and functionality described with respect to the utilization monitoring system 1000, and vice versa. For example, the boom lift 1110 may have some or all of the elements and functionality of the boom lift 1010, and vice versa. A user 1112 (e.g., operator, manager, owner, etc.) is viewing utilization, shown as utilization plot 1114, utilization percentage 1115, and graphical user interface (GUI) 1116 on a user device 1118. The graphical user interface 1116 may display one or more utilization values determined by the utilization monitoring system 1100 and other equipment information (e.g., status, state, maintenance information, etc.) as desired by the user 1112. In some embodiments, the utilization value is calculated on a time basis and/or an equipment position basis. In some embodiments, the utilization monitoring system 1100 stores the utilization values over a period of time or indefinitely, and a user may generate reports and view utilization information pertaining to some or all of the utilization values available to or stored by the utilization monitoring system 1100. In some embodiments, the utilization values are deleted based on a command from the user 1112 or a schedule or other criteria of the utilization monitoring system 1100 for managing the storage of utilization data.

As shown in FIG. 11, utilization over time (e.g., as determined by the utilization monitoring system 1100) is displayed graphically in utilization plot 1114. As shown, utilization plot 1114 includes time on the x-axis and metric of utilization on the y-axis (e.g., a percentage of a capacity, position information, user information, a value of time, etc.). In some embodiments, utilization plot 1114 may display utilization with respect to other variables or criteria (e.g., by device, by worksite, by customer, by location, etc.) as desired by the user. In some embodiments, the utilization plot 1114 is displayed on the graphical user interface 1116 of the user device 1118. In some embodiments, utilization is presented as utilization percentage 1115, which may be a real-time utilization, overall utilization, an averaged utilization, or utilization of a specific aspect (e.g., boom height, prime mover load, hydraulic load, etc.) of the boom lift 1110. In some embodiments, the utilization percentage 1115 may represent the machine's status as a percentage of the machine's rated capacity. For example, the utilization percentage 1115 may represent a ratio of boom height to maximum boom height, vehicle speed to maximum vehicle speed, time above a threshold value (e.g., boom height of 3 meters, threshold values 834, 836, etc.) to time below a threshold value, time above, below, or between threshold value(s), prime mover load to prime mover capacity, and still other ratios. The utilization percentage (e.g., utilization ratio) may be displayed graphically on the graphical user interface 1116 and may include bar charts, pie charts, donut charts, color bars, bar graphs, proportional area charts, bubble charts, etc.

Figure 12A:
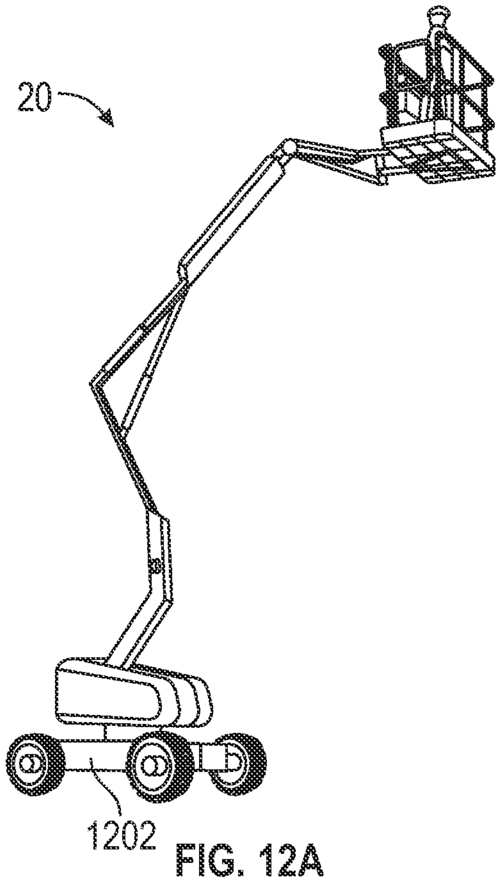
FIGS. 12A-12F are perspective views of work machines having a utility monitoring system, according to some embodiments.
Figure 12B:
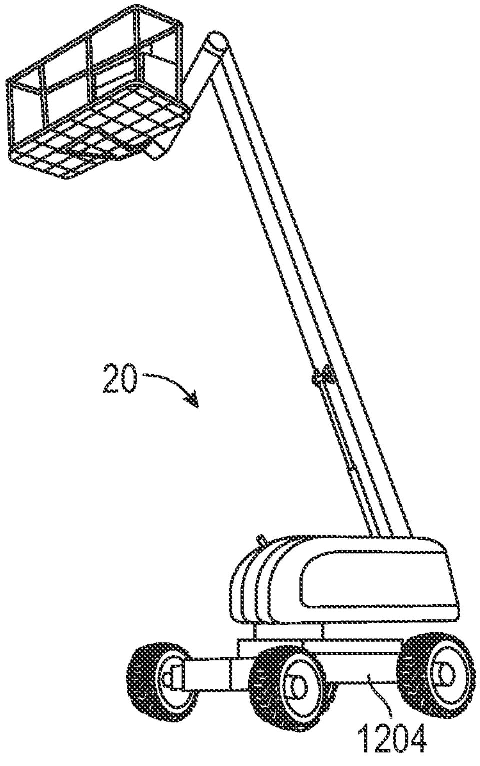
Figure 12C:
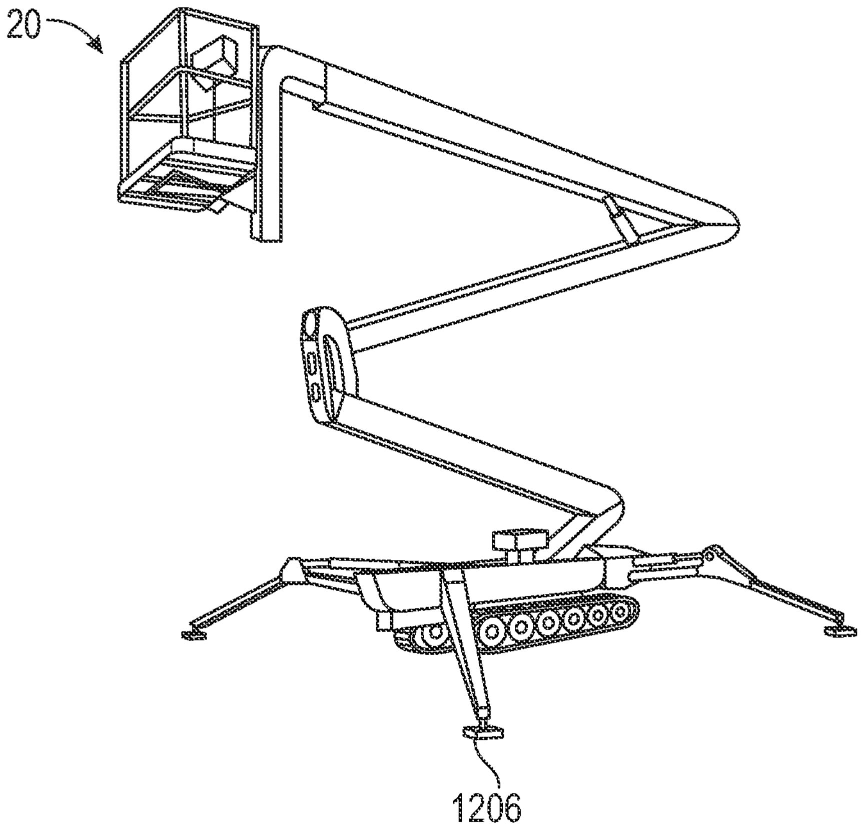
Figure 12D:
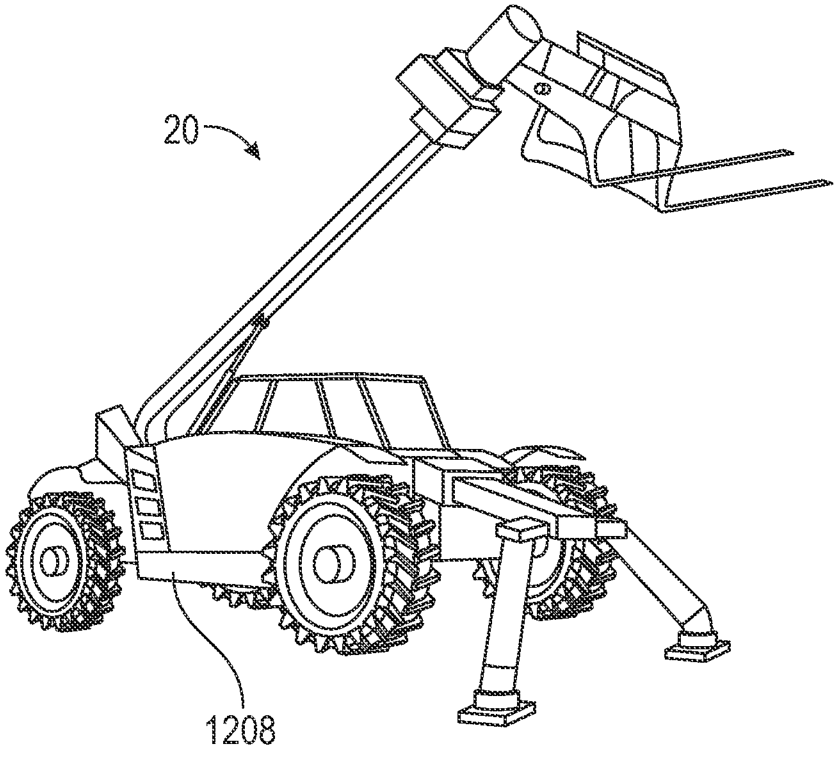
Figure 12E:
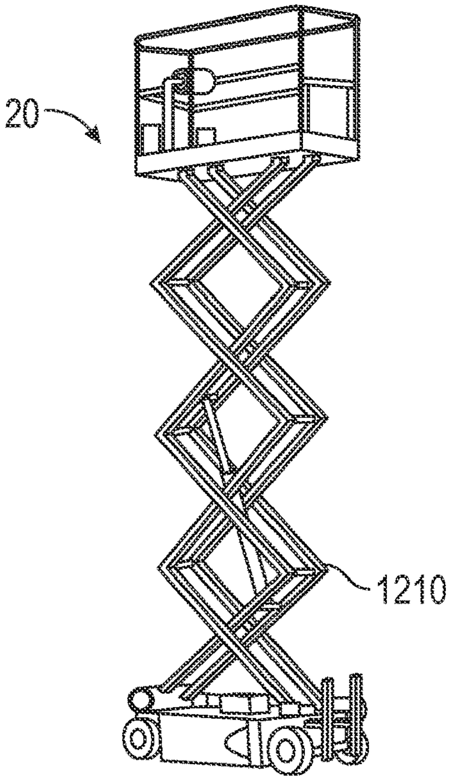
Figure 12F:
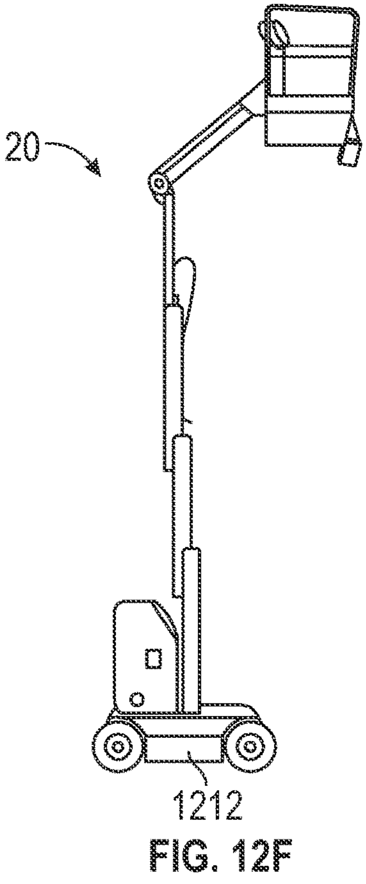

As shown in FIGS. 12A-12F, the utilization monitoring system and methods described above may be implemented using various work machines 20 such as an articulating boom lift 1202 as shown in FIG. 12A, a telescoping boom lift 1204 as shown in FIG. 12B, a compact crawler boom lift 1206 as shown in FIG. 12C, a telehandler 1208 as shown in FIG. 12D, a scissor lift 1210 as shown in FIG. 12E, and/or a toucan mast boom lift 1212 as shown in FIG. 12F. Although FIGS. 12A-12F illustrate specific examples of work machines, a person having ordinary skill in the art will appreciate that the examples shown in FIGS. 12A-12F is not intended to be a comprehensive list of work machines.

Figure 13:
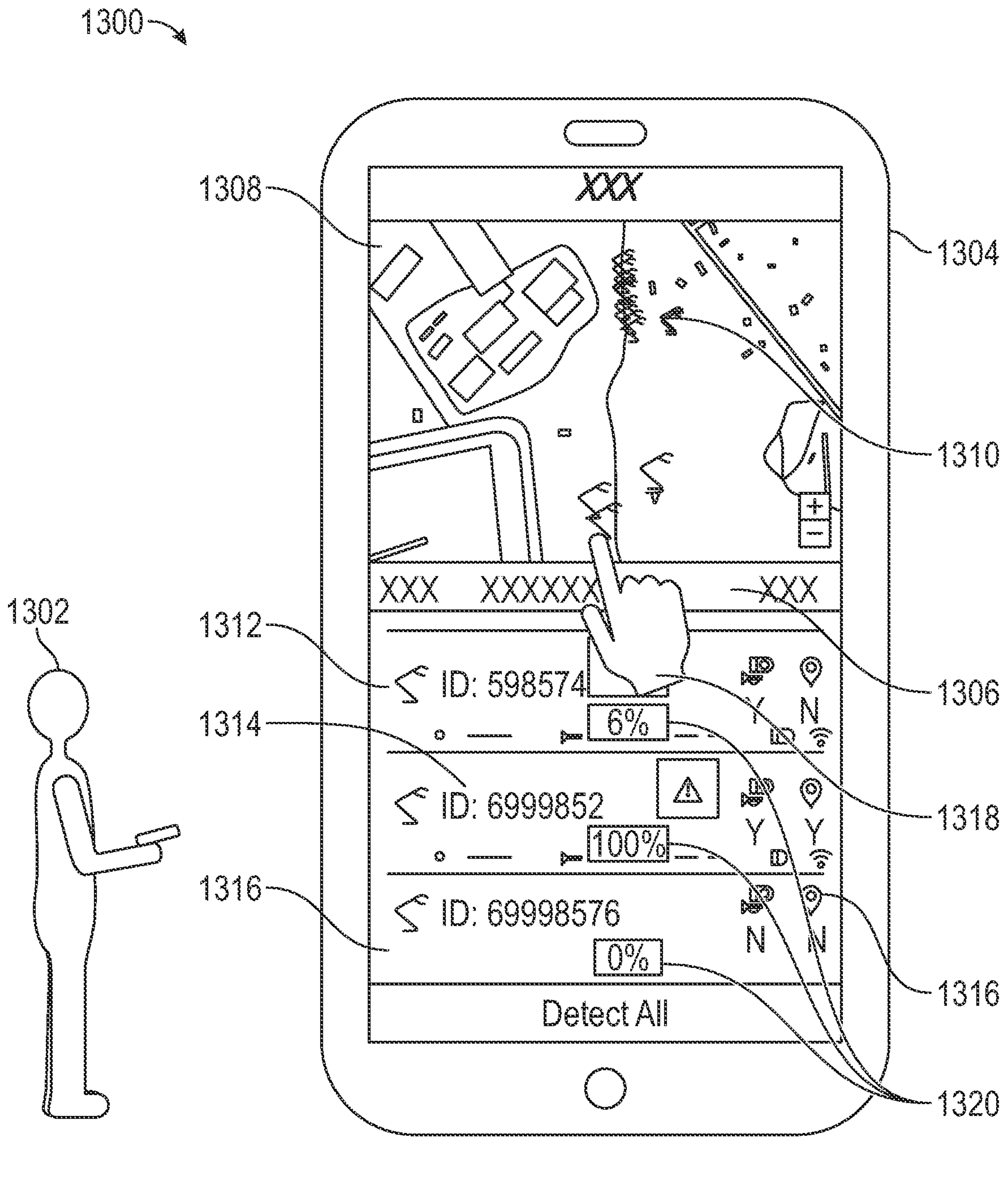
FIG. 13 is a perspective view of a utilization monitoring system user interface, according to some embodiments.

As shown in FIG. 13, a user 1302 may interact with the utilization monitoring system 1300 by interacting 1318 with an application hosted on a user device 1304 that generates a user interface 1308. The utilization monitoring system 1300 may have some or all of the elements and functionality described with respect to the utilization monitoring system 1100, and vice versa. The user device 1304 and work machines 1306 are interconnected via the connectivity module 218. The user 1302 selects a work machine 1306 from a view of a group of work machines 1306 connected to the connectivity module 218 at a work site. The user interface 1308 may depict, for example, imagery of a work site with overlays of machine locations (e.g., a map) 1310 and information regarding machine-specific information including status (e.g., fuel state, state of charge, etc.) 1312, 1314, 1316 and utilization 1320. The application may dynamically filter the map to illustrate the total machine population and locations, statuses, and utilizations of individual machines in the population. In some examples, a remote user may apply filters (e.g., filters related to machine status including self-test, fuel level, state of charge, utilization, etc.) to a specific work site network, much the same as can be done locally via an application on a mobile user device (e.g., in the instance where a remote user can apply the desired user configurable rules to assist a local user without the need of mobile application use). The user may select a machine or group of machines using an application and communicate with the machine or group of machines (directly or via a cloud) to have that machine provide utilization information (e.g., a duration of time the engine is operating, machine utilization as a percentage of machine capacity, etc.).

Figure 14:
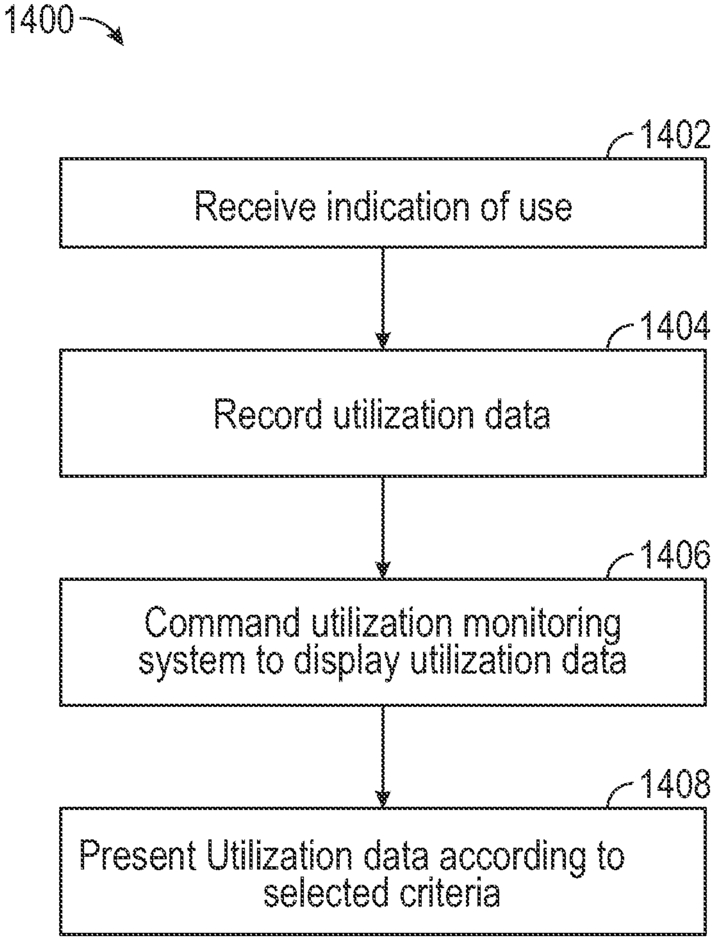
FIG. 14 is a flow diagram for using a utilization monitoring system, according to some embodiments.

As shown in FIG. 14, a flow diagram for using a utilization monitoring system (e.g., utilization monitoring system 700) is shown as process 1400. In some embodiments, process 1400 includes a first step, shown as indication step 1402. Indication step 1402 may include the utilization monitoring system receiving an indication of the work equipment being utilized (e.g., an ignition of the work equipment being turned to a powered position). The utilization monitoring system may obtain a set of one or more values representing an operational range of the work machine. For example, the utilization monitoring system may retrieve or determine values representing the limits 814, 816, 818, 820, values representing a period of time of a workday, a time remaining in a rental period according to a rental agreement or other agreement, a speed capacity, etc.

In some embodiments, process 1400 includes a second step, shown as recordation step 1404. In some embodiments, recordation step 1404 may include recording (e.g., monitoring and storing) sensor values, commands sent from a controller to actuators, commands sent to a controller from a user interface, time, and other utilization data (e.g., an operator identification, customer, worksite, etc.). For example, the recordation step 1404 may include collecting one or more values representing positions of the telescoping boom lift 710 based on sensor values 730, 735, 740, 745, 750, 755. In some embodiments, recordation step 1404 includes starting or stopping one or more timers based on recorded values. In some embodiments, recordation step 1404 includes determining one or more values representing the utilization of the work machine based on a comparison between the position values and the operational range (e.g., values defined between or being limits 814, 816, 818, 820) pertaining to the position values. In some embodiments, recordation step 1404 includes determining one or more values representing a utilization of the equipment based on a comparison between an elapsed time corresponding to utilization of the equipment and a different duration of time such as an hour, a day, a year, etc. In some embodiments, the elapsed time has a quantity of time equivalent to the quantity of time of the different duration of time, and the value representing utilization (on a time-basis) may be determined to be 100%. For example, if the elapsed time is 1 hour (e.g., corresponding to an ignition switch being in the on position for an hour, or an operator being detected in a platform for 1 hour) and the different duration of time is 1 hour, the value representing a time-based utilization may be indicated as being 100%.

In some embodiments, process 1400 includes a third step, shown as user command step 1406. In some embodiments, user command step 1406 includes the utilization monitoring system receiving a command to display utilization data recorded, processed, and managed by the utilization monitoring system. For example, the command may be to display one or more values representing utilization of the work machine according to one or more criteria such as a time period or based on an identifier of the operator.

In some embodiments, process 1400 includes a fourth step, shown as display step 1408. Display step 1408 may include presenting the recorded utilization data on a local or remote display or user device according to criteria selected by the user (e.g., worksite, client, task, day, month, year, utilization calculated based on a position, utilization based on an elapsed time, overall utilization, real-time utilization, utilization history, etc.).

In some embodiments, utilization information collected by the utilization monitoring system may be used by a producer (e.g., manufacturer, designer, engineer, etc.) of the work equipment to identify chronically underutilized or unutilized portions of available ranges and capacities of the work equipment or to identify areas of unexpected use (e.g., areas leading to failure, areas requiring frequent service, unanticipated applications of the work equipment, etc.). Similarly, the utilization information may be particularly useful to a purchaser or manager of work equipment to aid in the selection of work equipment for purchase and/or tasking by identifying actual use ranges and capacities of work equipment on a worksite.

As utilized herein, the terms “approximately,” “about,” “substantially”, and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term “exemplary” and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term “coupled” and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If “coupled” or variations thereof are modified by an additional term (e.g., directly coupled), the generic definition of “coupled” provided above is modified by the plain language meaning of the additional term (e.g., “directly coupled” means the joining of two members without any separate intervening member), resulting in a narrower definition than the generic definition of “coupled” provided above. Such coupling may be mechanical, electrical, or fluidic. For example, circuit A communicably “coupled” to circuit B may signify that the circuit A communicates directly with circuit B (i.e., no intermediary) or communicates indirectly with circuit B (e.g., through one or more intermediaries).

While various circuits with particular functionality are shown in FIGS. 1-2, it should be understood that the controller 44 may include any number of circuits for completing the functions described herein. For example, the activities and functionalities of the control system 60 may be combined in multiple circuits or as a single circuit. Additional circuits with additional functionality may also be included. Further, the controller 44 may further control other activity beyond the scope of the present disclosure.

As mentioned above and in one configuration, the "circuits" of the control system 60 may be implemented in machine-readable medium for execution by various types of processors, such as the processor 52 of FIG. 1. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

Although this description may discuss a specific order of method steps, the order of the steps may differ from what is outlined. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A work machine comprising:

a chassis;

a wheel rotatably coupled to the chassis;

an implement moveable relative to the chassis;

a user interface configured to receive a user input; and a utilization monitoring system comprising one or more memory devices configured to store instructions thereon that, when executed by one or more processors, cause the one or more processors to:

obtain one or more values representing an operational range of the implement;

receive the user input, the user input indicative of at least an operation;

determine a value representing a position of the implement;

determine a value representing a utilization of the implement by comparing the position of the implement to the one or more values representing the operational range of the implement; and in response to the utilization being above a threshold, cause a second work machine to perform the operation with the work machine.

2. The work machine of claim 1, wherein the instructions further cause the one or more processors to determine a value representing a motion of the implement by comparing the value representing the position of the implement to a value representing a position of the implement corresponding to an earlier point of time; and wherein determining the value representing the utilization of the implement comprises comparing the value representing the motion of the implement to the one or more values representing the operational range of the implement.

3. The work machine of claim 1, wherein the user interface comprises an input device operable in a first state and a second state, wherein when the input device is in the first state the implement is powered, and wherein when the input device is in the second state the implement is unpowered.

4. The work machine of claim 3, wherein the instructions further cause the one or more processors to determine a value representing a quantity of time during which the input device is in the first state.

5. The work machine of claim 4, wherein determining a value representing the utilization of the implement comprises comparing the value representing the quantity of time during which the input device is in the first state to a value representing a different quantity of time.

6. The work machine of claim 1, wherein the value representing the utilization of the implement is a value representing a ratio of the value representing the position of the implement and an operational threshold value of one of the one or more values representing the operational range of the implement.

7. The work machine of claim 1, further comprising a load sensor configured to detect a load applied to the implement; wherein determining a value representing the utilization of the implement comprises comparing the load to the one or more values representing the operational range of the implement.

8. The work machine of claim 7, wherein the one or more values representing the operational range of the implement is a function of the load detected by the load sensor.

9. The work machine of claim 1, wherein determining the value representing the utilization of the implement comprises determining whether the position of the implement corresponds to a value of a limit of the operational range.

10. The work machine of claim 9, wherein determining the value representing the utilization of the implement comprises determining whether the user input corresponds to the position of the implement exceeding the value of the limit of the operational range.

11. The work machine of claim 1, wherein the one or more values representing the operational range of the implement comprises a value representing a height limit of the implement relative to the chassis.

12. The work machine of claim 11, wherein the value representing the position of the implement is at least partially based on a value representing a height of the implement relative to the chassis.

13. The work machine of claim 12, wherein the implement comprises a platform.

14. The work machine of claim 13, wherein the user interface is a first user interface, further comprising a second user interface, wherein the first user interface is coupled to the implement.

15. A utilization monitoring system for work machines, the utilization monitoring system comprising:

one or more processors; and one or more memory devices configured to store instructions thereon that, when executed by the one or more processors, cause the one or more processors to:

obtain one or more values representing an operational range of a first implement of a first work machine;

obtain a value representing at least one of a position of the first implement or a load on the first implement;

determine a value representing a utilization of the first implement based on a comparison between the value representing the position of the first implement or the load on the first implement and the one or more values representing the operational range of the first implement; and in response to the value representing the utilization of the first implement of the first work machine being above a threshold, causing a second vehicle including a second implement and having a second operational range to perform an operation with the first work machine.

16. The system of claim 15, further comprising:

a user interface comprising a display and a user input device, the user input device configured to receive a user input;

wherein the instructions further cause the one or more processors to present, via a graphical user interface on the display, the value representing the utilization of the first implement.

17. The system of claim 15, wherein the instructions further cause the one or more processors to determine a value representing a comparison between the value representing the at least one of the position of the first implement or the load on the first implement and an operational threshold value.

18. The system of claim 17, wherein the instructions further cause the one or more processors to determine a value representing a quantity of time during which the value representing the comparison between the value representing the at least one of the position of the first implement or the load on the first implement and an operational threshold value is different than a second operational threshold value.

19. A method, comprising:

obtaining, via a utilization monitoring system, one or more values representing a first operational range of a first implement of a first work machine;

obtaining, via the utilization monitoring system, a value representing at least one of a position of the first implement or a load on the first implement;

determining a value representing a utilization of the first implement based on at least one of (i) a comparison between the value representing the position of the first implement or the load on the first implement and the one or more values representing the operational range of the first implement, or (ii) a comparison between a value representing an elapsed time during which an ignition is in a first position and a value representing a duration of time different than the elapsed time;

presenting, via a graphical user interface on a display, the value representing the utilization of the first implement; and in response to the value representing the utilization being above a threshold, causing a second vehicle including a second implement and having a second operational range to perform an operation with the first work machine.

20. The method of claim 19, wherein determining the value representing the utilization of the first implement is based on a quantity of time during which the value representing the at least one of the position of the first implement or the load on the first implement is above a threshold value.

* * * * *